Sept. 5, 1967 D. F. HOWARD 3,339,756
RACK TYPE DOUGH PROOFER
Filed June 7, 1965 9 Sheets-Sheet 1
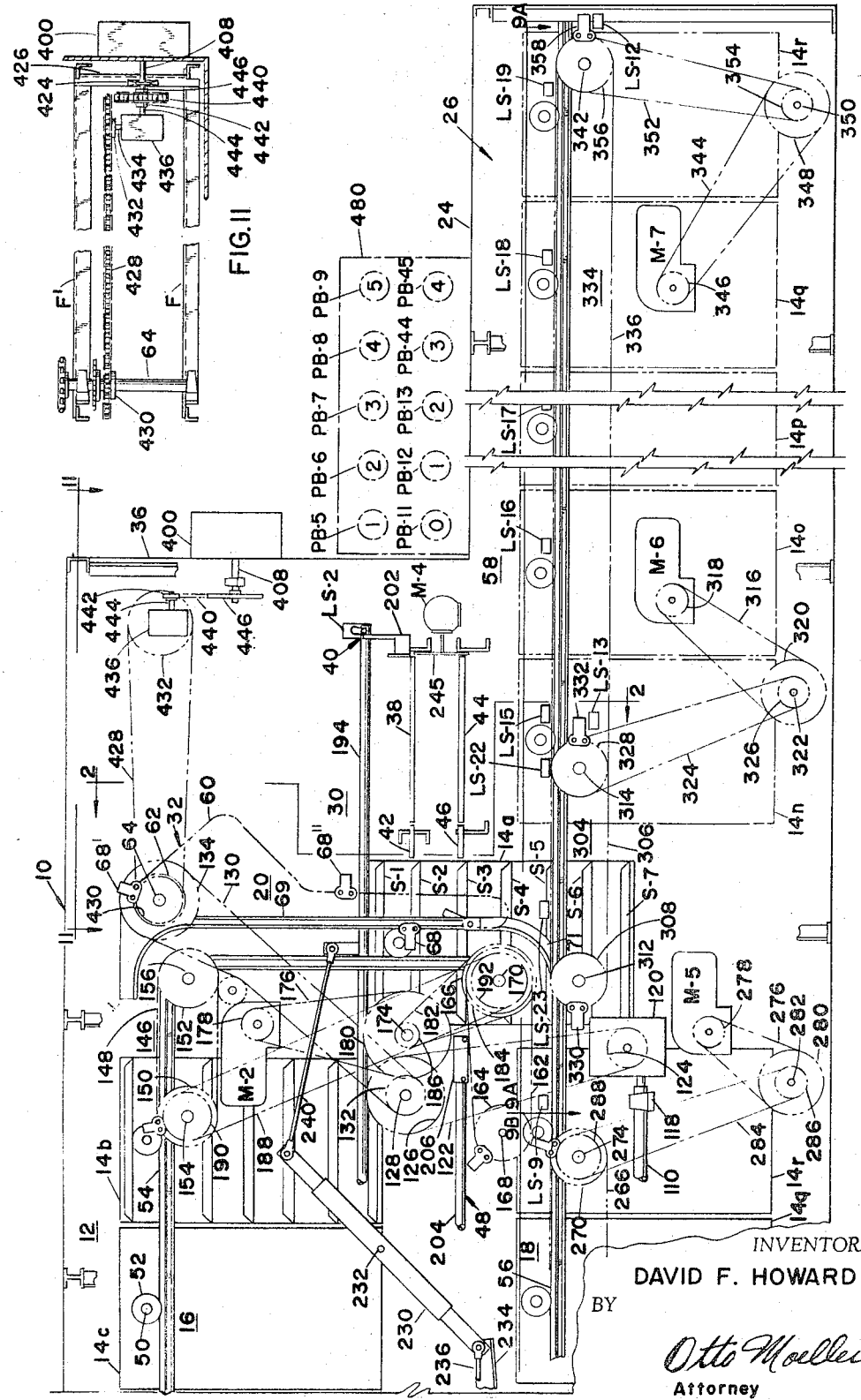
INVENTOR.
DAVID F. HOWARD
BY
Otto Moeller
Attorney Sept. 5, 1967  D. F. HOWARD  3,339,756
RACK TYPE DOUGH PROOFER
Filed June 7, 1965  9 Sheets-Sheet 2

INVENTOR.
DAVID F. HOWARD
BY
Otto Moeller
Attorney

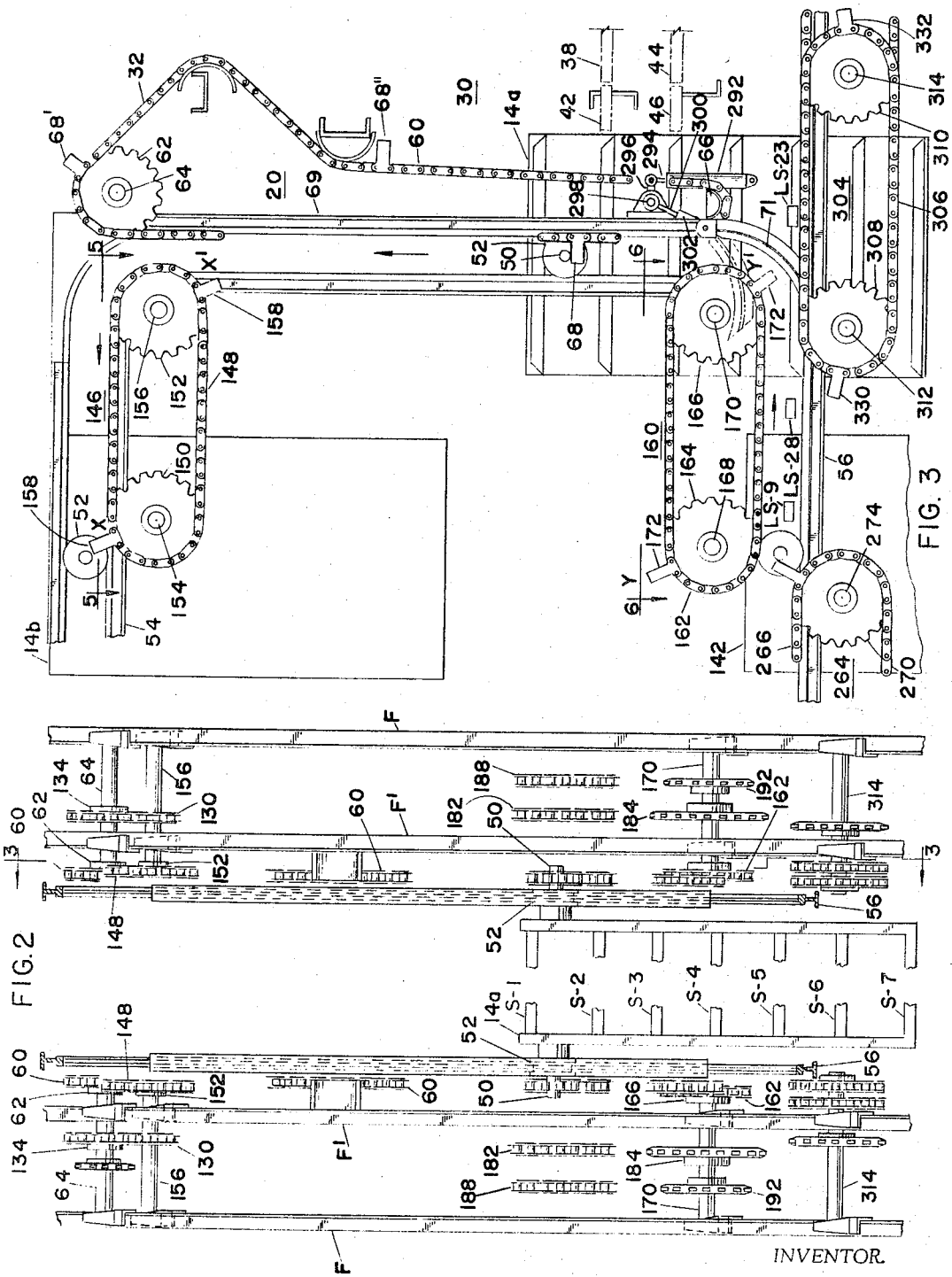

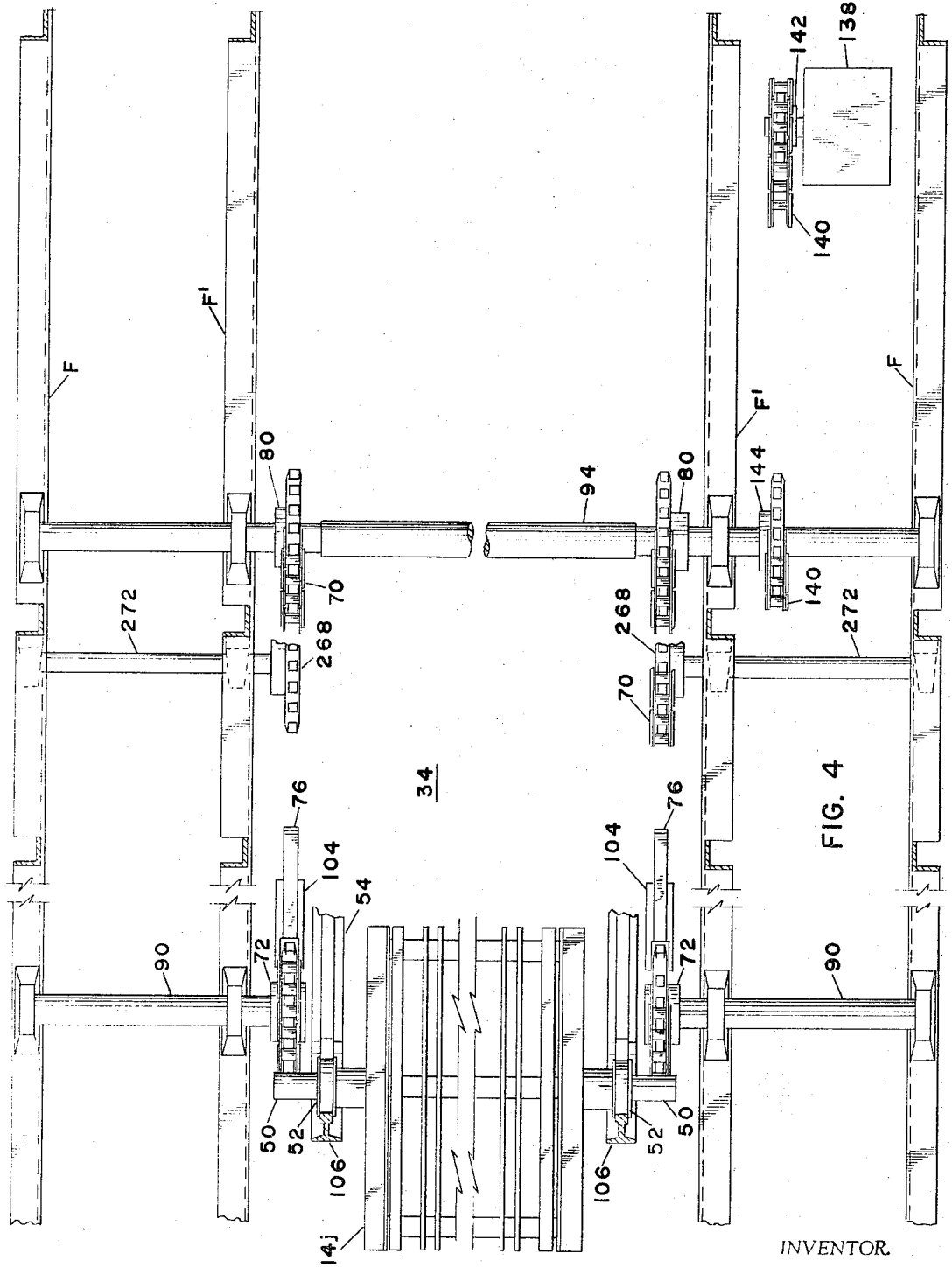

Sept. 5, 1967 D. F. HOWARD 3,339,756
RACK TYPE DOUGH PROOFER
Filed June 7, 1965 9 Sheets-Sheet 5

INVENTOR.
DAVID F. HOWARD
BY
*Otto Moeller*
Attorney

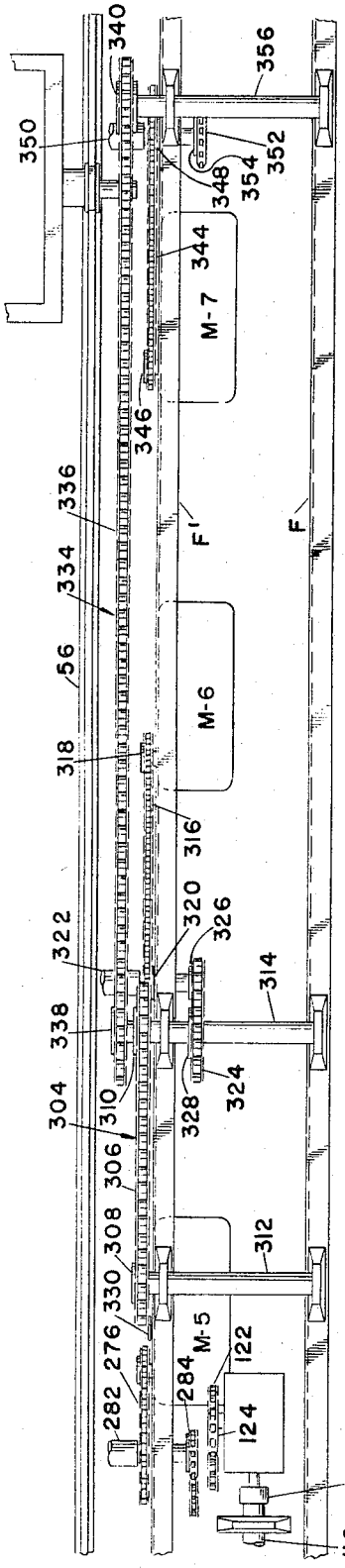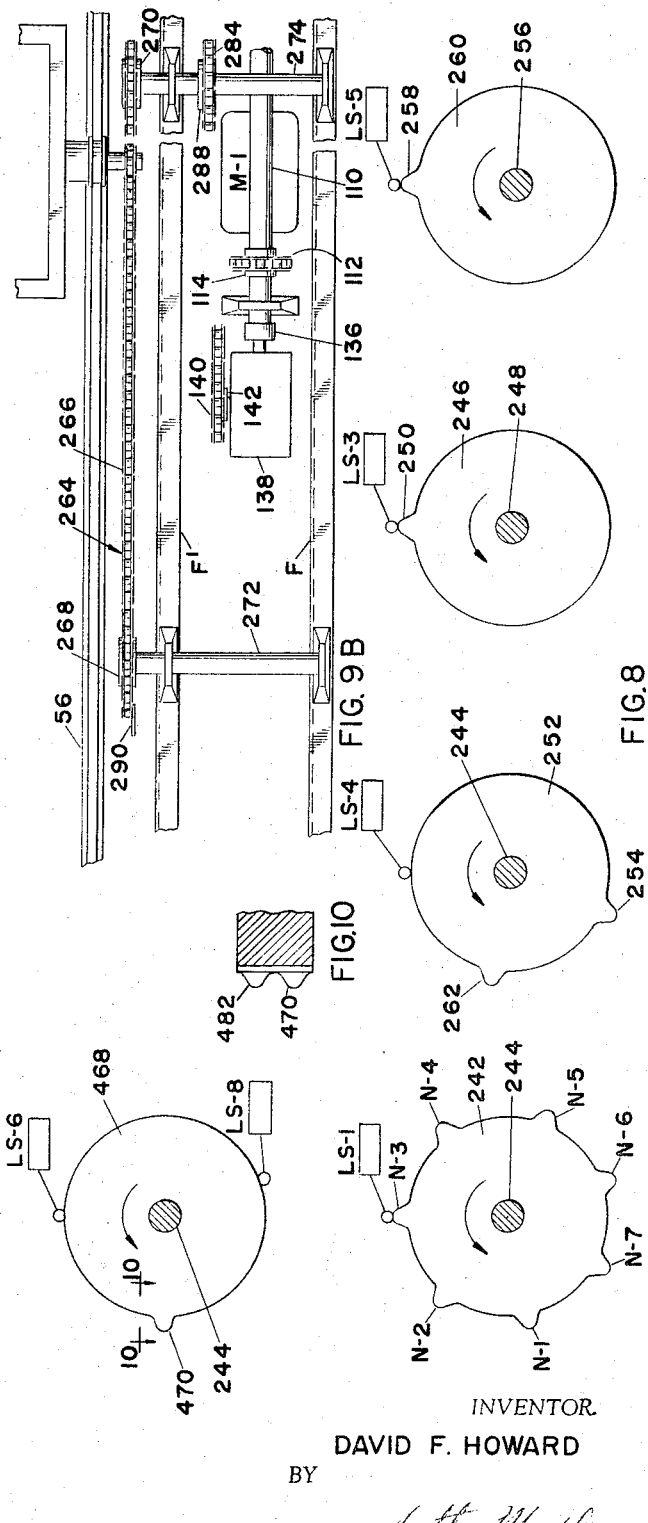

Sept. 5, 1967     D. F. HOWARD     3,339,756

RACK TYPE DOUGH PROOFER

Filed June 7, 1965     9 Sheets-Sheet 7

INVENTOR.
DAVID F. HOWARD
BY
*Otto Moeller*
Attorney

Sept. 5, 1967   D. F. HOWARD   3,339,756
RACK TYPE DOUGH PROOFER
Filed June 7, 1965   9 Sheets-Sheet 9

INVENTOR
DAVID F. HOWARD
BY
Otto Moeller
Attorney

United States Patent Office 3,339,756
Patented Sept. 5, 1967

3,339,756
RACK TYPE DOUGH PROOFER
David F. Howard, York, Pa., assignor to Read Corporation, York, Pa., a corporation of Delaware
Filed June 7, 1965, Ser. No. 461,807
17 Claims. (Cl. 214—16.4)

This invention relates to a continuous dough proofer and more particularly to a proofer of the type in which pans of dough to be proofed are disposed on vertically spaced shelves of racks and which racks are movable in a closed loop through the proofing chamber.

The closed rack conducting loop includes horizontal longitudinally extending upper and lower tracks on which the racks are pendently supported and along which contiguous racks are adapted to be pushed; elevating means for engaging and raising successive racks from the lower tracks through a loading and unloading station and releasing them to the upper tracks to push the row of contiguous racks ahead; and lowering means for engaging and lowering successive racks from the upper tracks and releasing them on the lower tracks to push the row of contiguous racks ahead. Disposed in the loading and unloading station rearwardly of and close to the path of the racks approximately midway of the upper and lower ends of the rack elevating means are a pair of transversely extending vertically spaced pan supporting infeed and discharge conveyors having pusher means associated therewith for transferring pans of dough from the infeed conveyor pan support to successive rack shelves and for transferring pans of proofed dough from successive rack shelves onto the discharge conveyor pan support.

In the course of a day's operation in a commercial bakery, successive runs of dough for various types of bread are introduced into the proofer, each run requiring a different proof time. For example, assuming the day's operation starts with a long proof time dough, such as requires a full complement of racks in the proofer, and this is to be followed by successive runs of dough requiring a lesser proof time without clearing the proofer between each run of dough; this is accomplished by permitting one or more empty racks to pass by the loading station between the runs of dough and then withdrawing the empty racks from the closed loop when they reach the forward end of the lower tracks of the closed loop, and providing means for accelerating the following racks through the space vacated by the withdrawn or diverted racks and transporting them through the loading and unloading station of the closed loop. In this manner, the racks of shorter proof time dough complete the circuit through the proofer in a shorter period of time resulting in a shorter proof time.

Conversely, a proofing operation conducted with less than a full complement of racks in the closed loop may be followed by a proofing operation requiring a longer proof time by inserting one or more of the withdrawn racks into the closed loop between the last rack of shorter proof time dough and the first rack of longer proof time dough.

In prior proofers of this type, one or more racks have been abstracted from the closed loop when they reach the rearward end of the lower tracks of the closed loop into a storage chamber at the rear of the proofer. In my improved construction the racks are abstracted from the forward end of the lower tracks of the closed loop into a rack storage chamber, a considerable portion of which occupies the space beneath the loading and unloading conveyors of the loading and unloading station of the proofer whereby the overall length of the proofer is considerably reduced and space that would otherwise be wasted is utilized. A concomitant saving in floor space which is always at a premium in a bakery results. A related object of the invention is to provide a novel construction and combination of means at the lower forward end of the proofer for selectively diverting racks from the closed loop or permitting them to follow through the closed loop, and for reinserting withdrawn racks into the closed loop at the lower forward end of the lower tracks of the closed loop.

Another object of the invention is to provide a novel and advantageous control system for automatically diverting empty racks from the closed loop following each successive run of dough without making a manual selection between such successive runs of dough. As an illustration, assume the day's production calls for five runs of dough of successively shorter proof times. When the proofer is almost filled with racks of the first or longest proof time dough run, the operator can even at this early stage make his selection to divert an empty rack after each successive run of dough, so that when the operator permits an empty rack to follow each successive run of dough, these empty racks are automatically diverted when they arrive at the forward end of the lower tracks of the closed loop of the proofer, in other words the operator does not have to wait until the empty racks are in the proofer to make his rack diverting selection.

A further object is to provide a proofer of the type described wherein racks are diverted from and re-inserted into the closed loop at the forward end of the lower tracks of the closed loop, and control means therefor whereby selection of a rack or racks for diversion or cancellation of such selection may be made at any time after passage thereof through the loading and unloading station and prior to arrival of the selected rack or racks at the forward end of the lower tracks of the closed loop of the proofer; and whereby selection of a rack or racks for re-insertion in the closed loop immediately following a predetermined rack and cancellation of such selection may be made at any time after passage of the predetermined rack through the loading and unloading station and prior to its removal from the forward end of the lower tracks of the closed loop of the proofer.

Other objects and advantages reside in certain novel features of construction, arrangement and combination of parts which are hereinafter more fully described, reference being had to the accompanying drawings, showing an exemplary embodiment of the invention. Referring to the drawings:

FIGURES 1A and 1B are partly diagrammatic, side elevational views of the forward and rearward portions respectively of the inside of a dough proofer illustrating generally the apparatus for conveying a plurality of racks in a closed circuit, for loading and unloading the shelves of the racks, for diverting selected racks from the closed circuit into a storage space in the forward end of the proofer, and for re-inserting racks into the closed circuit;

FIGURE 2 is an end view taken on irregular line 2—2 of FIGURE 1A looking in the direction of the arrows showing, in particular, elements of the drive means for the rack elevating conveyor, rack discharge conveyor, rack advance conveyor and rack diverting conveyor;

FIGURE 3 is a sectional view taken on line 3—3 of FIGURE 2 showing, in particular, elements of the rack elevating conveyor, rack discharge conveyor, rack advance conveyor and rack diverting conveyor;

FIGURE 4 is a sectional plan view taken on irregular line 4—4 of FIGURE 1B showing, in particular, elements of the rack lowering means;

FIGURE 6 is a top plan view taken on line 6—6 of

Figure 1B:
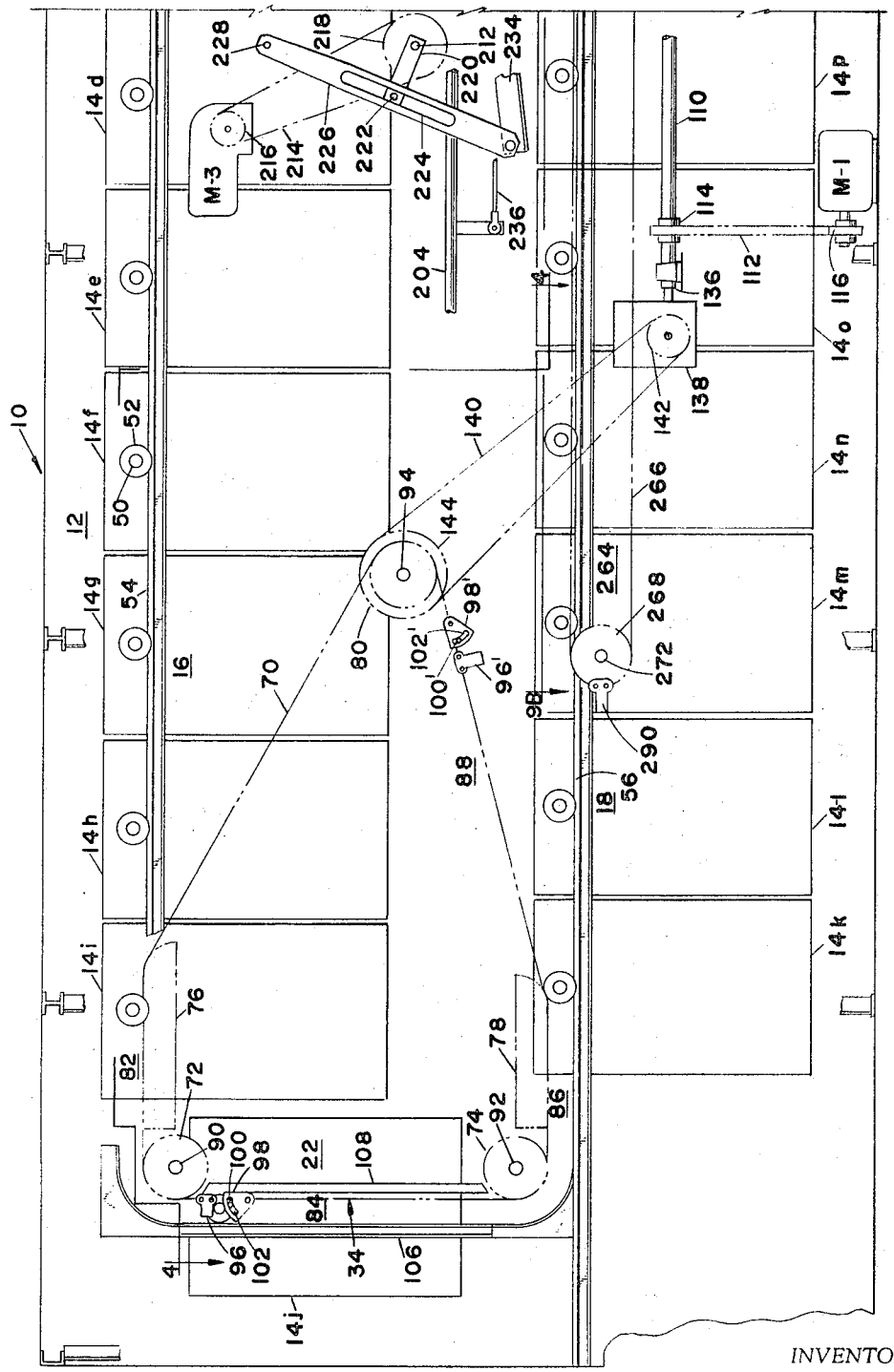
Figure 7:
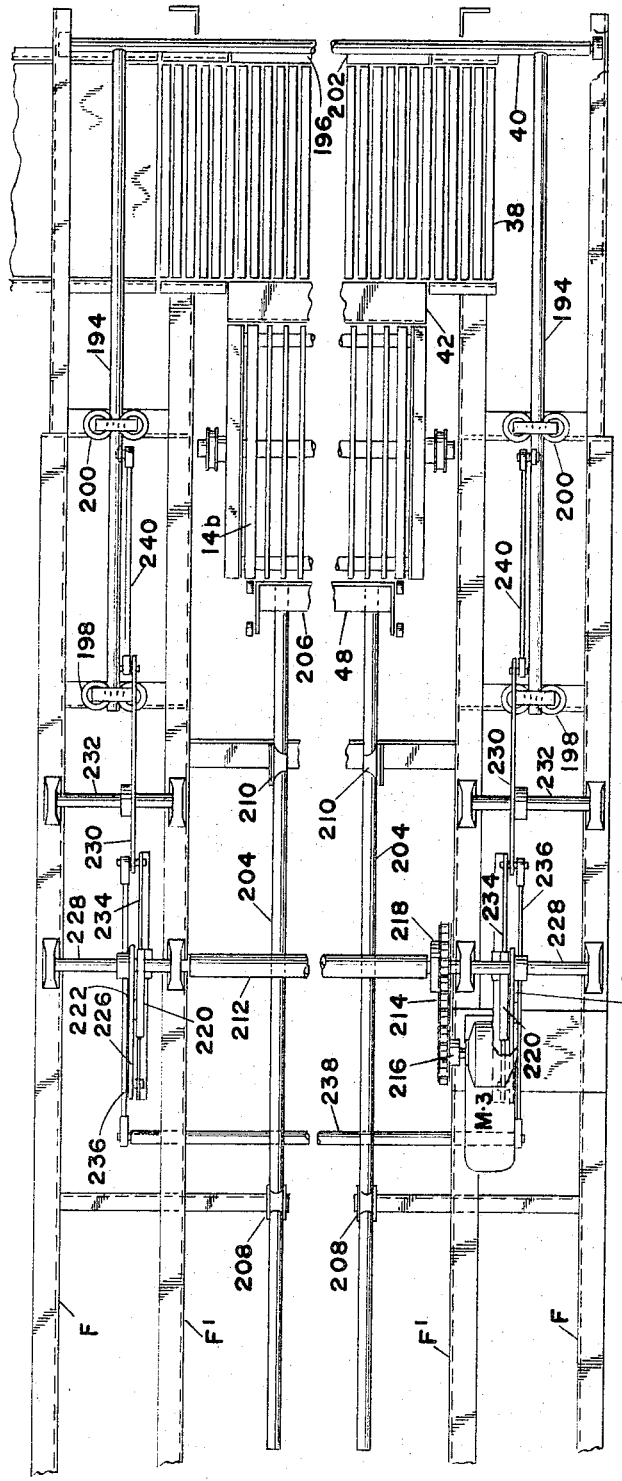
Figure 12:
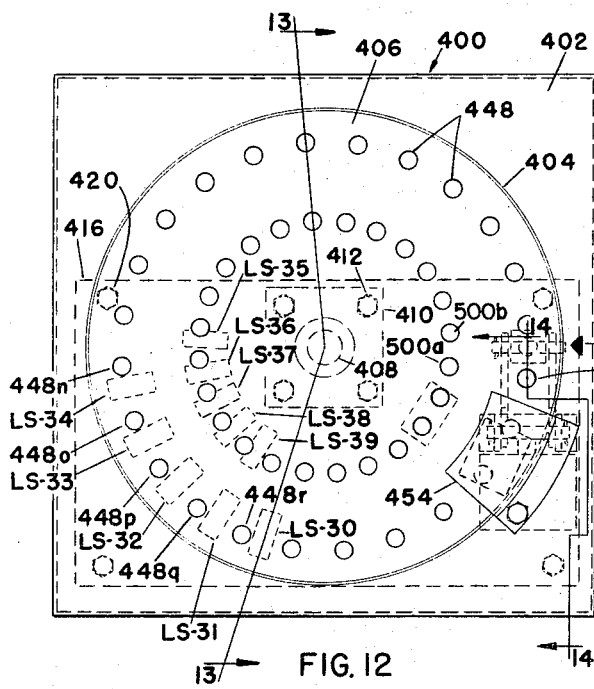
Figure 14:
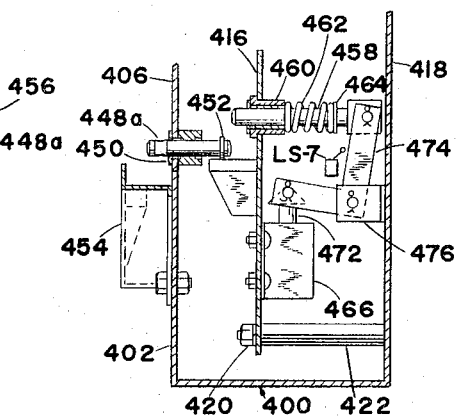
Figure 13:
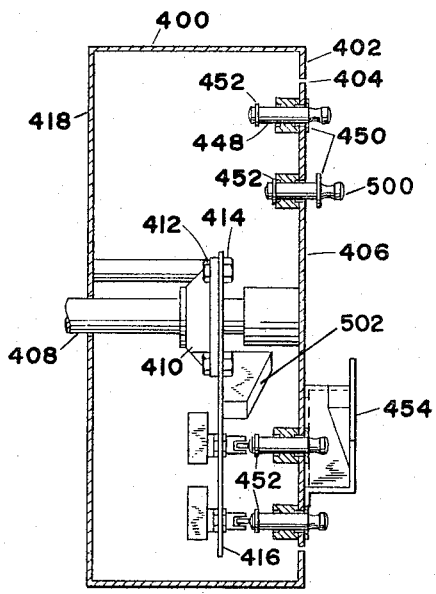
Figure 15B:
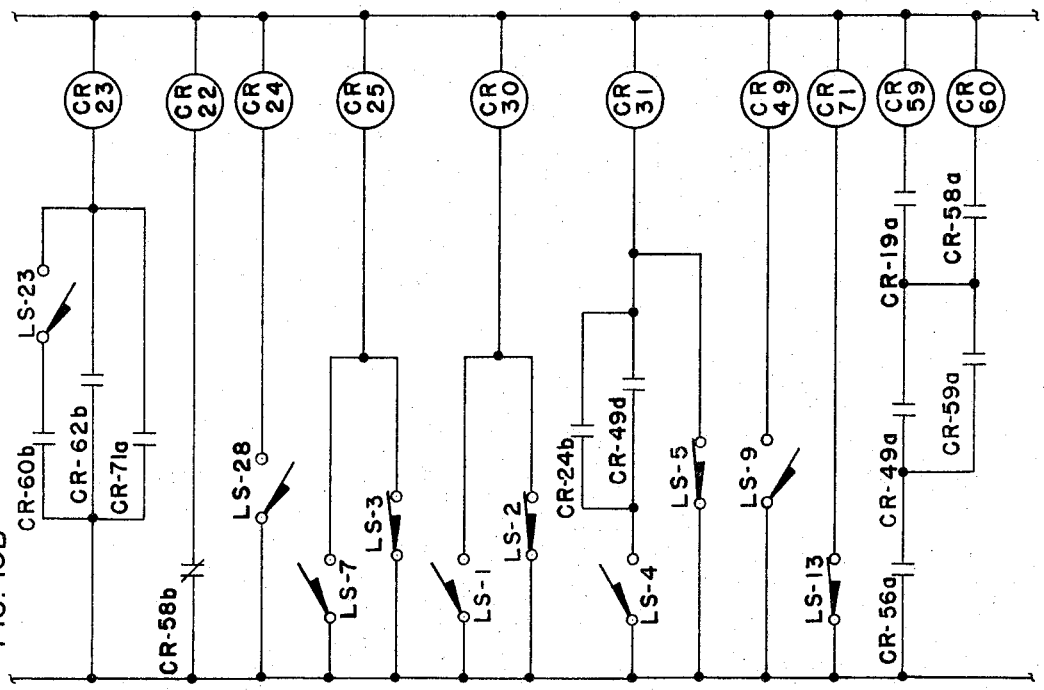
Figure 15A:
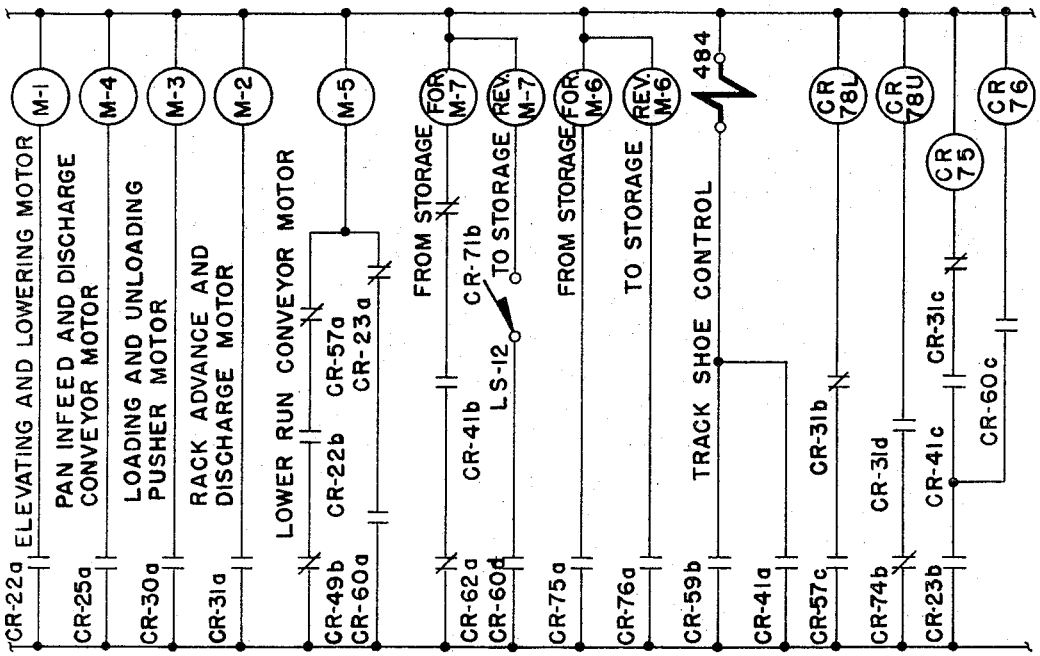
Figure 15D:
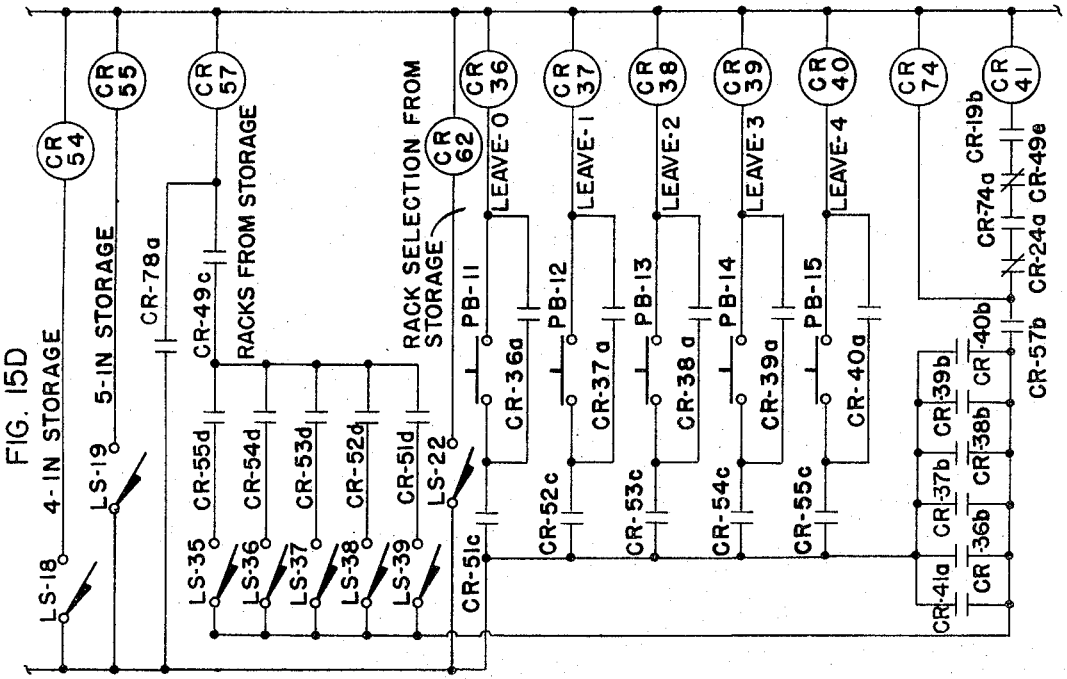
Figure 15C:
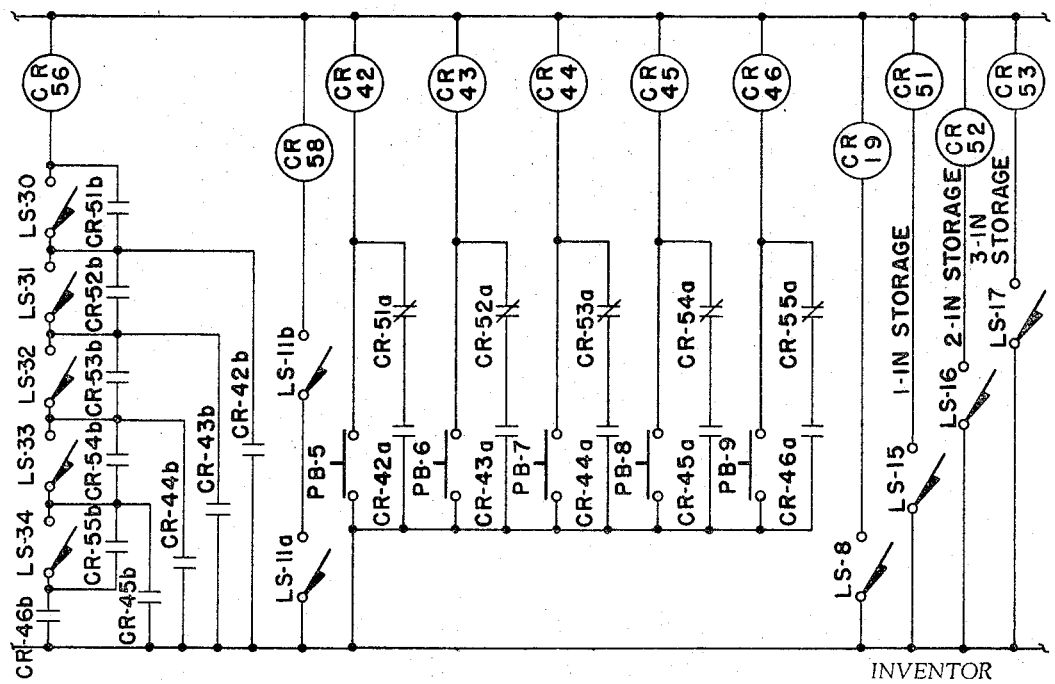

FIGURE 3 showing the portion of the rack advance conveyor on the left side of the proofer facing the front thereof;

FIGURE 7 is a top plan view through the forward portion of the proofer showing, in particular, the rack loading and unloading pushers and the operating means therefor;

FIGURE 8 is a diagrammatic view showing the relative positions of the nodes of the discs constituting a part of the control system of the proofer for synchronizing the operation of various elements thereof;

FIGURE 9A is a top plan view taken on line 9A—9A of FIGURE 1A showing the rack diverting conveyors, on the left side of the proofer facing the front thereof, together with the operating means therefor;

FIGURE 9B is a top plan view taken on line 9B—9B of FIGURES 1B and 1A showing the lower run rack conveyor, on the left side of the proofer facing the front thereof, together with the operating means therefor;

FIGURE 10 is a sectional view taken on line 10—10 of one of the control discs of FIGURE 8;

FIGURE 11 is a sectional top plan view taken on line 11—11 of FIGURE 1A with parts broken away;

FIGURE 12 is a view in front elevation of the control panel box of the proofer;

FIGURE 13 is a sectional view taken on line 13—13 of FIGURE 12;

FIGURE 14 is a sectional view taken on line 14—14 of FIGURE 12; and

FIGURES 15A, 15B, 15C and 15D are diagrammatic views of the electrical control system of the proofer.

Referring particularly to FIGURES 1A and 1B, my novel proofer comprises a generally rectangular elongated housing 10 defining a proofing chamber 12 through which racks 14, carrying pans of dough to be proofed, travel in an elongated closed loop including a longitudinally extending horizontal upper run 16, a longitudinally extending horizontal lower run 18, a vertical ascending run 20 at what is hereinafter called the front or loading and unloading end of the proofer, and a vertical descending run 22 at the opposite or rear end of the proofer. At the front end of the proofer housing 10 and communicating therewith is a smaller generally rectangular auxiliary housing 24. The auxiliary housing 24 is substantially the same in width as the proofer housing 10 but is considerably lower, somewhat less than half, in height. The auxiliary housing 24 defines a rack accommodating chamber 26 and is adapted to receive a number of racks 14 withdrawn from the lower run 18 of the closed loop, as and for the reasons hereinafter described.

The housing 10 and 24 are preferably in the form of a skeleton framework made up of suitable vertical and horizontal inter-connected angle irons or other suitable structural elements enclosed by sheet metal panels or other suitable enclosing means. The enclosing means is not shown in the drawings in order to better reveal the operating means within the housings 10 and 24. The skeleton framework includes at each side of the housings 10 and 24, outer and inner spaced frames F and F', as best shown in FIGURES 2, 4 and 7. Air under such temperature and relative humidity suitable for the proofing of the dough is supplied to the proofing chamber 12 by suitable air conditioning means, not shown.

The racks 14 are each in the form of an open rectangular framework having a plurality of equidistantly vertically spaced horizontal shelves, the whole being made up of metal bars, tubing or the like, with the shelves being of grid-like construction adapted to support a plurality of side by side dough pans 28.

The forward end of the proofing chamber 12 is arranged to provide a loading and unloading station 30, at which station successive rows of pans of unproofed dough are loaded onto successive shelves of the racks 14 and successive rows of pans of proofed dough are unloaded from successive shelves of the racks 14.

A continuously operating rack elevator, indicated as a whole by reference numeral 32, raises successive racks 14 through the loading and unloading station 30 from lower run 18 to upper run 16. Lowering means, indicated as a whole by reference numeral 34, lowers successive racks 14 from upper run 16 to lower run 18.

A pair of vertically spaced endless conveyors extend transversely within the proofer housing 10, in the loading and unloading station 30 between the rack elevator 32 and the front wall 36 of the proofer housing 10. These conveyors may be of any suitable type adapted for the conveyance of pans as, for example, slat type conveyors of well known construction in the conveyor art. The upper conveyor 38, hereinafter referred to as the loading conveyor, conveys the pans of dough in the proofer housing 10 to a position in front of a rack being elevated by the lack elevator 32, where pusher means, hereinafter referred to as the loading pusher 40, pushes successive groups of pans from the loading conveyor 38 across a transfer plate 42 onto successive shelves of a rack 14, as the rack is continuously elevated through the loading and unloading station 30. The lower conveyor 44, hereinafter referred to as the unloading conveyor, is adapted to convey laterally toward one side of the proofer housing 10, pans of proofed dough which have been pushed from successive shelves of a rack 14 across a transfer plate 46 onto the unloading conveyor 44 by pusher means, hereinafter referred to as the unloading pusher 48.

*Racks*

The racks 14 are all identical in construction, so that in describing details of any one particular rack, it will be understood that it applies in similar manner to each of the other racks. For purpose of illustration, the proofer is shown in FIGURE 1 with eighteen racks, it being understood that the proofer may be increased or decreased in size to accommodate a greater or lesser number of racks. In order to identify the racks individually, suffix letters *a*, *b*, *c*, etc., have been applied to the rack reference character 14. Referring particularly to FIGURE 1, rack 14*a* is shown as having seven equidistantly spaced shelves, designated from top to bottom by the reference characters S–1 to S–7, inclusive. While for purpose of illustration the racks 14 are shown with seven shelves and the operation of the apparatus is hereinafter described in respect of racks with seven shelves, it will become apparent that the apparatus is readily adaptable to handle racks with a lesser or greater number of shelves.

As illustrative of all the racks 14, rack 14*a* and 14*j*, as best shown in FIGURES 2 and 4, are provided at each lateral side thereof with a laterally outwardly projecting stub shaft 50 carrying an outboard roller 52. The stub shafts 50 and rollers 52 carried thereby are disposed above the center of gravity of the rack 14 between shelves S–1 and S–2 and are located centrally between the front and rear sides of the rack. The outer ends of the stub shafts 50 projecting beyond the rollers 52 are adapted to be engaged by lugs carried by the chains of the several rack conveying means of the apparatus, hereinafter described, for transporting the racks in the manner and for the purpose hereinafter set forth.

At each side of the proofing chamber 12, extending longitudinally along upper run 16, is an upper track 54. The upper tracks 54 are supported in any suitable manner from and laterally inwardly of the inner frame F' of the proofer housing 10. Similarly, at each side of the proofing chamber 12, extending longitudinally along lower run 18 of the aforesaid closed loop, is a lower track 56. However, the lower tracks 56 extend beyond the lower run 18 of the closed loop, through the portion of the proofer housing 10 below the loading and unloading station 30 and through the auxiliary housing 24. This last referred to portion of the proofer housing 10 and the rack accommodating chamber 26 of the auxiliary housing 24 form a rack storage space 58 when racks are diverted from the closed loop as and for the purpose hereinafter described. The lower tracks 56 are supported in any suitable manner from and laterally inwardly of the inner frame F' of the proofer and auxiliary housings 10 and 24. The tracks 54 and 56 provide guide supports along which the rack rollers 52 are adapted to roll as the racks are transported along the upper and lower runs 16 and 18 or as selected racks are diverted into rack storage space 58.

*Rack elevator*

The rack elevator 32, which elevates the racks 14 through the loading and unloading station 30 as previously described, includes a pair of endless chains 60 disposed in parallel laterally spaced planes sufficiently far apart, as best shown in FIGURE 2, to receive a rack 14 therebetween. The chains 60 are trained at their upper ends around sprockets 62 fixed on the inner ends of transversely extending stub shafts 64, which stub shafts are rotatably mounted in suitable bearings carried by outer and inner frame F and F' of the opposite sides of the proofer housing 10. At their lower ends, see FIGURE 3, the chains 60 are trained around shoes 66, suitably supported by inner frame F' of the opposite sides of the housing 10, it being understood that sprockets can be substituted for the shoes 66 if desired.

The length of the chains 60 are such as to carry three equidistantly spaced lugs 68, 68' and 68", as shown in FIGURES 1A and 3, with the distance between the lugs being equal to the distance between the top shelf and the bottom shelf of a rack plus one additional shelf space. The pairs of lugs 68, 68' and 68", in their travel along the ascending runs of the chains 60 as indicated by the directional arrow in FIGURE 3, engage the laterally outer end portions of the rack stub shafts 50 to elevate successive racks 14. With the described arrangement of the chains 60 and lugs 68, 68' and 68", the distance between the bottom shelf of one rack and the top shelf of a succeeding rack, as the racks are elevated through the loading and unloading station 30, will be exactly one shelf space. This is a desirable feature since it permits simultaneous loading and unloading at all times of not only two succeeding shelves of a single rack but also the bottom shelf of one rack and the top shelf of a succeeding rack. The chains 60 are preferably driven continuously and the means for driving them will be hereinafter described. A pair of laterally spaced upright guide tracks 69 are disposed along the ascending rack runs 20 in alinement with and adapted to be engaged by the rack rollers 52 for guiding the racks in their ascent from the lower tracks 56 to the upper tracks 54. The guide tracks 69 include the pivotally mounted curved lower track shoes 71 arranged, as hereinafter more particularly described, to swing upwardly away from lower tracks 56 out of the path of the rack rollers 52 to permit a selected rack or racks to by-pass the elevator for entry into rack storage space 58.

*Rack lowering means*

As previously set forth, the rack lowering means 34 lowers successive racks 14 from upper run 16 to a lower run 18 and it includes a pair of endless chains 70, as shown in FIGURE 4, disposed in parallel laterally spaced vertical planes sufficiently far apart to receive a rack 14 therebetween. Referring particularly to FIGURE 18, there is shown a chain 70 at one side of the proofer housing 10, trained around vertically spaced upper and lower driven sprockets 72 and 74, vertically spaced upper and lower longitudinally extending guide shoes 76 and 78, and drive sprocket 80. This chain, sprocket and guide shoe arrangement is duplicated at the opposite side of the proofer housing 10, to provide in the rack lowering means 34, a horizontal upper run 82 for moving successive racks rearwardly along upper tracks 54 into position to be lowered; a vertical descending run 84 for lowering successive racks to the lower tracks 56; a horizontal lower run 86 for moving successive racks forwardly along lower tracks 56; and a return run 88.

Referring particularly to FIGURE 4, the upper driven sprockets 72 are fixed on the inner ends of transversely extending stub shafts 90, which stub shafts are rotatably mounted in a suitable bearings carried by outer and inner frames F and F'. A similar arrangement is provided for the lower driven sprockets 74, the stub shaft for one of the sprockets 74 being indicated in FIGURE 1B by reference numeral 92. Referring to FIGURES 1B and 4, the drive sprockets 80 are fixed on a transverse through shaft 94 disposed in the space between the upper and lower row of racks 14, shaft 94 being journaled at its ends in suitable bearings carried by the outer and inner frames F and F' at opposite sides of the proofer housing 10. Thus, by rotating through shaft 94, as later described, both chains 70 are driven.

The chains 70 are each provided with a pair of radially outwardly projecting equidistantly spaced lugs 96 and 96', which lugs are adapted to engage the laterally outer end portions of the rack stub shafts 50 to move the racks along the upper and lower runs 82 and 86 of the chains 70. The chains 70 are each additionally provided with a pair of pivotally mounted latch members 98 and 98' just ahead of the lugs 96 and 96'. The latch members 98 and 98' provide means for supporting the racks 14 as they descend along the descending runs 84 of the chains 70. Pivotal movement of the latch members 98 and 98' is limited by reason of engagement of chain pin extensions 100 and 100' in slots 102 and 102' in the free end portions of the pivoted latch members 98 and 98', whereby the latch members 98 and 98' are movable between a retracted position out of the path of a rack stub shaft 50 and an extended position in the path of a rack stub shaft 50.

The upper chain guide shoes 76 are provided adjacent their upper edges with laterally projecting longitudinally extending cam guides 104 disposed in the path of the latch members 98 and 98' arranged to raise the latch members from retracted to extended position immediately after the latch members have reached a position just beyond the stub shafts 50 of a terminal rack on upper run 16, as when a rack is in the position of rack 14*i*.

A pair of laterally spaced upright guide tracks 106 are disposed along the descending rack run 22 in alinement with the adapted to be engaged by the rack rollers 52. A second pair of upright guides 108 are disposed in alinement with and extending along the descending runs 84 of the endless chains 70 at the inner forward sides thereof. The guide tracks 106 and guides 108 cooperate to provide smooth transfer of the racks 14 from the upper run 16 of the racks to the lower run 18 of the racks.

The chains 70 of the rack lowering means 34 are continuously driven in timed relation with the chains 60 of the rack elevator, as hereinafter described, so that as a rack is being elevated, another rack is being lowered at the opposite end of the proofer, the chains 70 traveling through a distance equal to the spacing between lugs 96 and 96' in the same time that chains 60 travel through a distance equal to the spacing between a pair of successive lugs 68, 68', 68".

*Rack elevator and rack lowering means drive*

The rack elevator 32 and the rack lowering means 34 are operated from a single motive source, continuously operating gear head reduction motor M–1, whereby they operate in synchronized timed relation. The motor M–1 is mounted in the lower left side of the proofer, being suitably supported by the proofer housing framework between outer and inner frames F and F'. Motor M–1 drives a longitudinally extending torque tube 110 journaled in suitable bearings carried by the proofer housing framework between outer and inner frames F and F'. The drive means includes a chain 112 trained around sprockets 114 and 116 fixed, respectively, on torque tube 110 intermediate the ends thereof, and on the output shaft of gear head motor M–1. The forward end of the torque tube 110 is connected by a flexible coupling 118 with the input shaft of a speed reducing unit 120, as best shown in FIGURE 1A. A chain 122 is trained around a sprocket 124 fixed on the output shaft of speed reducing unit 120 and a sprocket 126 fixed on a transversely extending through shaft 128 suitably journaled in bearings carried by the framework of opposite sides of the proofer housing. A pair of chains 130 at opposite sides of the proofer are trained around sprockets 132 fixed on opposite ends of through shaft 128, as best shown in FIGURE 2, and around sprockets 134 fixed on the stub shafts 64 of the previously described rack elevator 32 for operating the same.

The rearward end of the torque tube 110, as shown in FIGURE 1B, is connected by a flexible coupling 136 with the input shaft of a speed reducing unit 138. A chain 140 is trained around a sprocket 142 fixed on the output shaft of speed reducing unit 138, and a sprocket 144 fixed on the through shaft 94 of the previously described rack lowering means 34 for operating the same, as shown in FIGURES 1B and 4.

*Rack discharge conveyor*

An intermittently operating rack discharge conveyor 146 at the forward end of upper run 16 picks up a rack 14 that has been elevated by the rack elevator 32, and conveys it along tracks 54 through a distance and at a rate of speed to provide clearance for the succeeding rack that is being elevated. The rack discharge conveyor 146 includes a pair of endless chains 148 disposed in vertical longitudinal laterally spaced planes.

Figure 5:
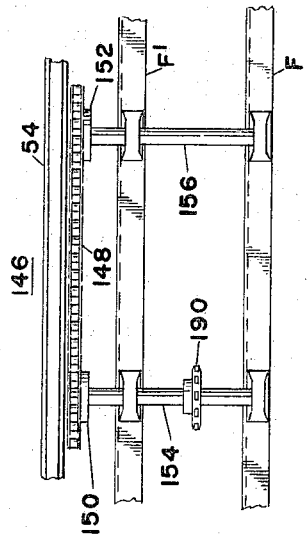
FIGURE 5 is a top plan view taken on line 5—5 of FIGURE 3 showing the portion of the rack discharge conveyor on the left side of the proofer facing the front thereof.

Referring particularly to FIGURES 1A, 3 and 5, showing the construction and arrangement of elements on the left side of the proofer, the chain 148 is trained around rearward drive sprocket 150 and forward driven sprocket 152. The sprocket 152 is so disposed that the chain 148, as it rounds the extreme forward peripheral portion of the sprocket 152, is spaced a distance rearward of the ascending run of the elevator chain 60 to freely permit rack stub shafts 50 to pass between the adjacent portions of the chains 60 and 148. The upper run of the chain 148 is disposed laterally outwardly of and slightly above the level of the upper track 54, and extends therealong a distance to move a rack from the rack elevator 32 to the position shown occupied by rack 14b in FIGURES 1A and 3.

The sprockets 150 and 152 are fixed on the inwardly projecting ends of stub shafts 154 and 156, respectively, which shafts are journaled in suitable bearings carried by the outer and inner frames F and F' of the housing framework, as best shown in FIGURE 5. Rack discharge conveyor chain 148 carries a radially outwardly projecting lug 158 which is arranged to engage the stub shaft 50 of a rack that has been elevated by the elevator chain 60; and to then move the rack rearwardly along the track 54 to the position shown occupied by rack 14b. It will be understood that the various elements of the rack discharge conveyor 146, described above, are duplicated at the opposite side of the proofer housing 10.

The chains 148 of the rack discharge conveyor 146 are driven intermittently in counterclockwise direction, as viewed in FIGURES 1A and 3, to move lugs 158 from phantom line position X', in readiness to pick up a rack, to full line rack release position X, and then from position X to position X'. The rack discharge conveyor is operated in timed relation, by means hereinafter described, with the rack elevator 32, so that when a rack has been elevated to a position when its stub shafts 50 are in approximate horizontal axial alinement with the rack discharge conveyor stub shafts 156, operation of the rack discharge conveyor from position X' is initiated. The rack discharge conveyor operates at a greater speed than the rack elevator, in the present instance approximately three times as fast, so that the lugs 158 overtake the lugs 68, 68' or 68", whichever happen to be supporting a rack in the aforesaid position, and lift the rack from the rack elevator 32, and also move the rack a horizontal distance at least such that its lower trailing edge clears the leading upper edge of a succeeding rack that is being elevated. The rack discharge conveyor lugs 158 push an elevated rack along the upper tracks 54 to the position shown occupied by rack 14b, FIGURES 1A and 3, and in so doing, the pushed rack, which in the present instance would be rack 14a, engages rack 14b to push it ahead to the position shown occupied by rack 14c. Consequently, all the racks 14 on upper run 16 will be pushed ahead one rack space, with rack 14h being pushed ahead to the position shown occupied by rack 14i, in FIGURE 1B, in readiness to be engaged by the lowering means 34, it being understood that at this time rack 14i has already been removed by the lowering means 34 from its FIGURE 1B position.

In order that the rack discharge conveyor lugs 158 may pass by the elevator lugs 68, 68' or 68" in lifting and removing a rack from the elevator 32, the rack discharge conveyor chains 148 are offset slightly laterally with respect to the elevator chains 60, as best shown in FIGURE 2, or alternatively, if the chains are in alinement the lugs 158 may be offset slightly laterally of the lugs, 68, 68' or 68"

*Rack advance conveyor*

The rack advance conveyor 160 moves successive racks 14 along the lower tracks 56 and the curved track shoes 71 of the elevator guide tracks 69 from the position shown occupied by rack 14r in FIGURES 1A and 3 to a position wherein they are adapted to be picked up by the lugs 68, 68' or 68" of the elevator 32.

As previously pointed out, the lugs 68, 68' and 68" of the elevator chains 60 are spaced apart a distance such that the bottom shelf of one rack and the top shelf of a succeeding rack, as the racks are elevated through the loading and unloading station 30, will be exactly one shelf space apart. Referring particularly to FIGURE 3, it is apparent that rack 14r (and this applies to all the racks when occupying the position of rack 14r (and this applies to all the racks when occupying the position of rack 14r) cannot be moved into position to be picked up by the rack elevator 32 until the preceding rack 14a has been elevated a distance to provide clearance thereunder for rack 14r. It is also apparent that because of the distance that rack 14r must travel at that time to place it in position to be picked up by the oncoming lugs 68" of the rack elevator chains 60, the rack advance conveyor 160 must travel at a considerably greater speed than the rack elevator 32, in the present instance about three times as fast. It is furthermore important that the rack advance conveyor 160 be operated in timed relation with the rack elevator 32, so that racks are presented by the rack advance conveyor 160 at the proper time to be picked up by the rack elevator 32.

The rack advance conveyor 160 includes a pair of endless chains 162 disposed in vertical longitudinal laterally spaced planes.

Figure 6:
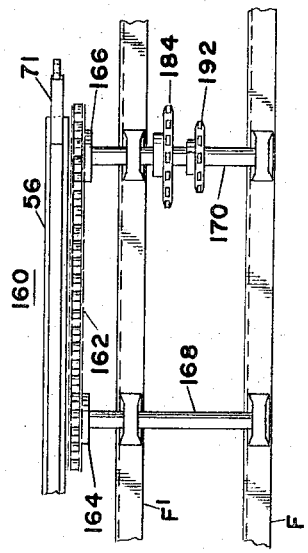

Referring particularly to FIGURES 3 and 6, showing the construction and arrangement of elements on the left side of the proofer, the chain 162 is trained around rearward driven sprocket 164 and forward drive sprocket 166. The sprocket 166 is so disposed that the chain 162, as it rounds the extreme forward peripheral portion of the sprocket 166 is spaced a distance rearward of the ascending run of the elevator chain 60 to freely permit rack stub shafts 50 to pass between the adjacent portions of the chains 60 and 162. The lower run of the chain 162 is disposed above and laterally outward of the lower track 56 and extends therealong a distance to move a rack from the position shown occupied by rack 14r to a position to be picked up by the rack elevator 32.

The sprockets 164 and 166 are fixed on the inwardly projecting ends of stub shafts 168 and 170, respectively, which shafts are journaled in suitable bearings carried by the outer and inner frames F and F' of the housing framework. Rack advance conveyor chain 162 carries a radially outwardly projecting lug 172, which is arranged to engage a rack stub shaft 50 for moving a rack in the manner set forth above. It will be understood that the various elements of the rack advance conveyor 160, described above, are duplicated at the opposite side of the proofer housing 10.

The chains 162 of the rack advance conveyor 160 are driven intermittently in counterclockwise direction as viewed in FIGURES 1A and 3, to move lugs 172 from full line position Y to phantom line position Y' whereby to advance a rack from the position shown occupied by rack 14r to a position where it can be picked up by the rack elevator, and then from phantom line position Y' to full line position Y on a return or dry run, in readiness to engage a succeeding rack that has been moved into position shown occupied by rack 14r.

Rack advance conveyor 160 and rack discharge conveyor 146 are operated simultaneously by motor M-2, through means hereinafter described.

*Rack advance and rack discharge conveyor drive means*

Gear head reduction motor M-2 is conveniently mounted in the left side of the proofer, as best shown in FIGURE 1A, and is suitably supported by the proofer housing framework between outer and inner frames F and F'. A transversely extending through shaft 174, journaled at its ends in suitable bearings carried by the outer and inner frames F and F' of the opposite sides of the proofer housing, is driven by a chain 176 trained over a sprocket 178 fixed on the output shaft of motor M-2 and a sprocket 180 fixed on through shaft 174 between the outer and inner frames F and F' of the left side of the proofer housing.

Still referring to FIGURE 1A, a chain 182 is trained around a sprocket 184 and a sprocket 186, respectively fixed on the stub shaft 170 of rack advance conveyor 160 and the through shaft 174, between outer and inner frames F and F' of the left side of the proofer housing. A similar chain and sprocket arrangement, though not shown, is provided between outer and inner frames F and F' of the right side of the proofer housing. Through the means just described, both chains 162 of the rack advance conveyor are driven.

Referring to FIGURES 1A, 5, and 6, a chain 188 is trained over sprockets 190 and 192, respectively fixed on the stub shaft 154 of the rack discharge conveyor 146 and the stub shaft 170 of rack advance conveyor 160, between outer and inner frames F and F' of the left side of the proofer housing. A similar chain and sprocket arrangement, though not shown, is provided between outer and inner frames F and F' of the right side of the proofer housing. Through the means just described, both chains 148 of the rack discharge conveyor 146 are driven.

Suitable timing means, hereinafter described, operated in timed relation with rack elevator 32 is employed for controlling intermittent operation of the motor M-2 to operate the rack advance conveyor 160 and the rack discharge conveyor 146 in the manner previously described.

*Loading pusher*

Referring particularly to FIGS. 1A, 1B and 7, the loading pusher 40 comprises a pair of laterally spaced, longitudinally extending tubular frame members 194 at opposite sides of the racks 14, connected together at their forward ends by a transversely extending tubular frame member 196. Suitably supported by the framework at each side of the proofer housing are a pair of laterally spaced rearward concave rollers 198 and a pair of laterally spaced forward concave rollers 200. The longitudinal tubular frame members 194 are retained between the pairs of rearward and forward rollers 198 and 200, whereby the loading pusher 40 is freely movable in a longitudinal path. A pusher bar 202 is pendently supported from transverse pusher frame member 196 and is adapted to sweep across the loading conveyor 38 and transfer plate 42 for pushing successive rows of pans of dough from the loading conveyor 38 onto successive rack shelves as the racks are continuously elevated through the loading and unloading station. Reciprocating intermittent movement is imparted to the loading pusher 40 by drive means hereinafter described, in timed relation with elevation of the rack elevator 32, as also hereinafter described.

*Unloading pusher*

The unloading pusher 48 comprises a pair of laterally spaced, longitudinally extending tubular frame members 204 disposed inwardly of and below the loading pusher side frame members 194, the frame members 204 being connected at their forward ends by a transversely extending pusher bar 206. Each of the longitudinal tubular frame members 204 is received between and supported by a pair of vertically spaced concave rearward rollers 208 and a pair of vertically spaced concave forward rollers 210, whereby the unloading pusher bar 206 is freely movable in a longitudinal path.

By means hereinafter described, reciprocating intermittent movement is imparted to the unloading pusher 48, from a retracted home or rest position, as shown in FIGURE 1A, to an extended position and back to its retracted position. On the extending strokes of the unloading pusher 48, the pusher bar 206 sweeps successive rows of pans of proofed dough from successive rack shelves across pivotally mounted transfer plate 46 onto the unloading conveyor 44, as the racks are continuously elevated through the loading and unloading station 30.

*Loading and unloading pusher operating means*

The loading and unloading pushers 40 and 48 are operated through linkage means from a single motive source, motor M-3, whereby pushers 40 and 48 are operated simultaneously on an extending stroke to load and unload two successive rack shelves and on a retracting or return stroke.

Gear head reduction motor M-3 is conveniently mounted between outer and inner frames F and F' at the left side of the proofer housing. Referring to FIGURES 1B and 7, a transversely extending through shaft 212 disposed in the space between the racks of upper run 16 and lower run 18 and journaled at its ends in suitable bearings carried by outer and inner frames F and F' of the housing 10, is driven by chain 214 trained over sprockets 216 and 218 fixed, respectively, on the laterally inwardly projecting end of the motor output shaft and on one end of the through shaft 212, the chain 214 being disposed in the space between inner frame F' and the side of the racks 14 of upper run 16. Secured on extensions of the shaft 212, between outer and inner frames F and F', at each side of the housing 10, are radially extending crank arms 220.

Referring to the mechanism on the left side of the proofer, which is duplicated on the right side thereof, the free end of crank arm 220 carries a cam follower 222 engaging a cam groove 224 in a pusher operating arm 226. The pusher operating arm 226 is pivotally mounted at its upper end on a transverse stub shaft 228 journaled in suitable bearings carried by outer and inner frames F and F', the stub shaft 228 and through shaft 212 being disposed in a common transverse vertical plane, with stub shaft 228 spaced above the through shaft 212.

A second pair of pusher operating arms 230, FIGURES 1A and 7, are fixed intermediate their ends on stub shafts 232 between outer and inner frames F and F' at opposite sides of the housing 10, the shafts 232 being disposed in a common horizontal plane with through shaft 212 and in forward spaced relation with respect to through shaft 212. Suitable bearings, carried by outer and inner frames F and F', are provided for the stub shafts 232. Tie bars 234 are pivotally connected at their respective ends with the lower ends of the pusher operating arms 226 and 230. Through the above described linkage, it will be seen that for each complete revolution of the crank arms 220, the pusher operating arms 226 and 230 will oscillate through a limited distance.

Tie rods 236 pivotally connect the lower ends of the pusher operating arms 230 with the opposite ends of a transversely extending bar 238 which is rigidly secured inwardly of its ends to the unloading pusher side frame members 204, and tie rods 240 pivotally connect the upper ends of the pusher operating arms 230 with the loading pusher side frame members 194 intermediate their ends. The swing of the pusher operating arms 226 and 230 between their limiting positions is such that loading pusher bar 202 and unloading pusher bar 206 will reciprocate in the manner previously described for loading pans of dough from loading conveyor 38 onto the rack shelves and for unloading pans of dough from the rack shelves onto unloading conveyor 44.

Timing means, hereinafter described, operated in timed relation with rack elevator 32, is employed for controlling intermittent operation of the motor M–3 so that through the linkage described, the loading and unloading pushers complete a round trip (an extending and retracting stroke) during each elevation of a rack through one rack shelf space, and complete such round trip in a minor fraction of the time required for elevation of the rack through one rack shelf space.

*Operation with full complement of racks*

For purpose of illustration, assume that to handle a baker's maximum production rate, at a maximum proof time of 72 minutes, a proofer having a full complement of 18 racks of 7 shelves each, as shown in the drawings, is provided, the operating speed of the rack elevating means being such that a rack completes a loading and unloading cycle in four minutes, or in other words a rack is elevated through a rack shelf space in approximately 34 seconds.

Referring particularly to FIGURE 8, a cam disc 242, having 7 equidistantly spaced nodes N–1 through N–7, is mounted on a shaft 244 that is operated in timed relation with the rack elevator 32 to rotate the cam disc 242 through one node space for each elevation of a rack through one shelf space. Thus, shaft 244 makes one complete revolution for each travel of the rack elevator through a distance equal to the distance between two successive rack engaging lugs of the rack elevator, as for example, the distance between lugs 68 and 68', which distance, as previously pointed out, equals the distance between the top and bottom shelf of a rack plus one additional rack shelf space.

In FIGURE 8, the nodes are designated N–1 through N–7 to represent respective shelves S–1 through S–7 of a rack being elevated through the loading and unloading station. In the position of rack 14a as illustrated in FIGURES 1A and 3, with its shelf S–2 in proper position to be loaded and its shelf S–3 in proper position to be unloaded, node N–3 of cam disc 242 closes a normally open cam limit switch CLS–1 thereby completing a circuit to and energizing control relay CR–30 (reference being had to the wiring diagram), to thereby close normally open contact CR–30a and operate motor M–3, causing the pushers 40 and 48 to start simultaneously on their pushing or extending stroke. As soon as the pushers start, a normally closed switch LS–2, FIGURE 1A, which is held open by the loading pusher 40 in its retracted position, will close to complete a holding circuit to motor M–3, whereby the pushers will continue to operate when node N–3 of cam disc 242 runs off switch CLS–1 causing it to re-open. A row of pans of unproofed dough is thereupon pushed from loading conveyor 38 onto rack shelf S–2 by loading pusher 40, and a row of pans of proofed dough is pushed from rack shelf S–3 onto unloading conveyor 44 by unloading pusher 48. The speed of the pushers is arranged to be such that they complete a pushing and retracting stroke in considerably less time than that required for the rack to be elevated through one rack shelf space, approximately 11 seconds in the above illustration or approximately ⅓ of the 34 seconds required for the rack to be elevated through one rack shelf space, at which time node N–3 will have advanced approximately ⅓ of a node space from the position shown in FIGURE 8.

When the pushers 40 and 48 return to their retracted positions, loading pusher 40 again engages and opens normally closed switch LS–2, thereby breaking the holding circuit to motor M–3 to interrupt operation of the pushers 40 and 48. As the loading pusher 40 approaches its retracted position, it momentarily closes a normally open limit switch LS–7 completing a circuit to and energizing control relay CR–25. Energization of control relay CR–25 closes its contact CR–25a to initiate operation of the motor M–4 for operating the loading and unloading conveyors 38 and 44 through any well known suitable drive connections diagrammatically shown at 245 in FIGURE 1A. The drive connections may conveniently be such as disclosed in my copending application Ser. No. 365,580, filed May 7, 1964.

A cam disc 246, FIGURE 8, is mounted on a shaft 248 operatively connected to motor M–4 to make one revolution for a linear travel of the loading and unloading conveyors 38 and 44 to bring in a new row of pans of dough into position to be loaded and to remove from in front of the rack the row of pans of proofed dough that has been unloaded. Upon initiation of operation of the motor M–4, it will be observed that node 250 of cam disc 246 rides off normally closed limit switch LS–3, thereby holding the circuit to the motor M–4 upon re-opening of the momentarily closed limit switch LS–7, whereby the loading and unloading conveyors 38 and 44 will make the aforesaid linear travel. Upon completion of this linear travel, the cam disc 246 will have completed one revolution, whereupon node 250 will engage switch LS–3 to open the circuit to and stop motor M–4. The speed of the loading and unloading conveyors 38 and 44 is such that they complete their linear travel by the time the rack has completed its one shelf space elevation, or in other words by the time node N–4 of cam disc 242 engages switch LS–1. Thus, during each elevation of a rack through one rack shelf space in the above stated 34 second time period, the pushers operate for approximately 11 seconds or ⅓ of the time period, and the loading and unloading conveyors operate for the remaining approximately 23 seconds or ⅔ of the time period.

When rack 14a has been elevated from the position shown in FIGURES 1A and 3 to a position where its lowermost shelf S–7 clears the product on top shelf S–1 of rack 14r and preferably when shelf S–7 is approximately ⅓ of a rack shelf space below its unloading position, operation of the rack discharge conveyor 146 and the rack advance conveyor 160 is simultaneously initiated to move lugs 158 on a dry or empty run from full line position X to phantom line position X' and to move lugs 172 on a rack engaging run from full line position Y to phantom line position Y', all as previously described.

Initiation of such operation of the rack discharge and rack advance conveyors is controlled by a cam disc 252 mounted on shaft 244 which, as before stated, makes one revolution while the rack is elevated through seven rack shelf spaces. A node 254 is disposed on the cam disc 252 so that when rack 14a has been raised to the position described in the preceding paragraph, the node 254 engages and closes normally open cam limit switch LS–4, thereby completing a circuit through a now closed contact CR–49a (to be referred to in more detail later in the description) to and energizing control relay CR–31. Energization of control relay CR–31 closes its normally open contact CR–31a completing a circuit to and initiating operation of motor M-2. Operated in timed relation with motor M-2 is a shaft 256, FIGURE 8, arranged to make one revolution while the lugs 158 and 172 of the rack discharge and rack advance conveyors 146 and 160 move from their positions X and Y to positions X' and Y'. When motor M-2 starts, a node 258, on a cam disc 261 that is fixed on shaft 256, rides off a normally closed cam limit switch LS-5, thereby completing a circuit to and maintaining motor M-2 energized when node 254 of cam disc 252 rides off normally open switch LS-4. When cam disc 260 completes one revolution, node 258 will again engage and open switch LS-5, breaking the circuit to and stopping motor M-2. During this operation of the motor M-2, it will be seen that lugs 158 have made a dry or empty run from position X to position X' in readiness for engaging and discharging rack 14a, and lugs 172 have made a rack advancing run from position Y to position Y' to bring rack 14r in position to be picked up by rack elevator lugs 68'. As previously stated, the rack discharge and rack advance conveyors 146 and 160 are operated at a greater speed than the rack elevator 32, three times the speed in the present instance, whereby to assure arrival of rack 14r in time to be picked up by rack elevator lugs 68'.

Continued operation of the rack elevator 32 will now raise both racks 14a and 14r, and when shelf S-7 of rack 14a reaches its loading position and shelf S-1 of rack 14r reaches its unloading position, at which time node N-1 closes normally open switch LS-1 completing the circuit to motor M-3, pushers 40 and 48 will simultaneously start on their pushing stroke. Upon completion of the return strokes of the pushers 40 and 48, at which time the racks 14a and 14r will have been elevated a portion of a rack shelf space, operation of the rack discharge and rack advance conveyors 146 and 160 is simultaneously initiated to move lugs 158 on a rack engaging run from position X' to position X and to move lugs 172 on a dry or empty run from position Y' to position Y, all as previously described. Initiation of such operation of the rack discharge and rack advance conveyors is controlled by a node 262 on cam disc 252, which cam disc, as before stated makes one revolution while a rack is elevated through seven rack shelf spaces. Node 262 is disposed on cam disc 252 to engage normally open switch LS-4 when rack 14a reaches the above position, or as previously described, when the rack stub shafts 50 are in approximate horizontal axial alinement with the rack discharge conveyor stub shafts 156. Engagement of node 262 with switch LS-4 completes a circuit to and again starts motor M-2. As soon as motor M-2 starts, node 258 of cam disc 260 will again ride off normally closed switch LS-5 to complete a circuit to and maintain motor M-2 energized when node 262 of cam disc 252 rides off normally open switch LS-4. When cam disc 260 completes its one revolution, node 258 will again engage and open switch LS-5, breaking the circuit to and stopping motor M-2, with the lugs 158 and 172 in their X and Y positions.

The rack discharge and rack advance conveyors 146 and 160 now remain in their last position as the rack 14r is continuously raised through the loading and unloading station, whereupon the cycle of events is repeated.

Assume that the proofer with a full complement of racks, as described above, will handle a baker's maximum production rate at a maximum proof time of 72 minutes, allowing 4 minutes for each rack to complete its loading and unloading cycle. Different types of bread dough require different proof times, so that if this maximum proof time bread dough is to be followed by a shorter proof time dough, it is possible to speed up the proofer as a whole. However, this necessitates clearing of the proofer of the maximum or long proof time dough before the shorter proof time dough can be introduced, since if the proofer is speeded up while long proof time dough is still in the proofer, the latter will not receive its required proof time. In the above illustration, this would mean a break in production of 72 minutes. In order to minimize this break time in production, one or more racks have previously been abstracted from the closed loop when they reached the rearward end of the lower run of the closed loop remote from the loading and unloading station, into a storage chamber at the rear of the proofer, means being provided along the lower run extending forwardly from the rearward end thereof for accelerating the movement of the racks of shorter proof time dough through the vacancy formed by the withdrawal of the said one or more racks, whereby they completed the circuit through the proofer in a shorter period of time resulting in a shorter proof time, the extent of such shorter proof time being determined by the number of racks abstracted. Conversely, to follow a short proof time dough with a longer proof time dough, one or more abstracted racks were reinserted into the lower run of the closed loop at the rear of the proofer immediately preceding the first rack of long proof time dough.

In the present construction means is provided whereby racks are abstracted from the forward end of the lower run of the closed loop into the rack storage space 48, a considerable portion of which occupies the space beneath the loading and unloading conveyors 38 and 44 of the loading and unloading station 30 of the proofer housing 10, whereby the overall length of the proofer is considerably reduced.

For purpose of illustration, assume the 72 minute proof time dough is to be followed by 52 minute proof time dough. The operator will then, at the conclusion of the 72 minute proof time dough run, permit five empty racks to pass by the loading and unloading station, which racks will be introduced into the rack storage space 58, by means hereinafter described, when they reach the forward end of the lower run of the closed loop.

*Lower run conveyor*

Extending along lower run 18, as best shown in FIGURES 1A and 1B, is an endless conveyor 264, the upper run of which is disposed in a plane slightly above the plane of the lower tracks 56. The conveyor 264 is arranged to be rendered operative in diverting racks from the closed loop into the rack storage space 58 and to move racks ahead through the space vacated by the racks in the storage space 58, as will be hereinafter more particularly described. Conveyor 264 does not necessarily have to operate when the proofer is operating with a full complement of racks, however, to insure exact location of successive racks in the position shown occupied by rack 14r for engagement by the rack advance conveyor 160, the electrical system is shown in FIGURE 15 and is hereinafter described to render conveyor 18 operative when the proofer is operating with a full complement of racks.

The conveyor 264 will be described with particular reference to FIGURES 9A and 9B, which show the details thereof at the left side of the proofer, it being understood that they are duplicated at the opposite side of the proofer. Endless chain 266 of conveyor 264 is trained around tandem arranged rear and front sprockets 268 and 270, which sprockets are fixed on laterally inner extensions of respective stub shafts 272 and 274, which stub shafts are rotatably mounted in suitable bearings carried by the outer and inner frames F and F'. The conveyor chains 266 of conveyor 264 are disposed in the space between inner frames F' and the proximate sides of the racks and are driven from a gear head reduction motor M-5 which is disposed in the lower left side of the proofer between outer and inner frames F and F'. The drive means includes a chain 276 trained around a sprocket 278 fixed on the output shaft of motor M-5 and a sprocket 280 fixed on the left hand end of a transversely extending through shaft 282, which shaft is suitably journaled in bearings carried by the framework of opposite sides of the proofer housing. A pair of chains 284 at opposite sides of the proofer are trained around sprockets 286 fixed on opposite ends of through shaft 282, and around sprockets 288 fixed on the stub shafts 274 of the conveyor 264 for operating the same.

The endless chains 266 of lower run conveyor 264 each carries a radially outwardly projecting lug 290. The lugs 290 when moving along the top run of the chains 266 in the direction of the arrows are arranged to engage the rack stub shafts for moving the racks forwardly along the lower tracks 56 of the proofer. The forward end of the lower run conveyor 264 is disposed so that the lugs 290 will leave a rack in the position shown occupied by rack 14r in FIGURES 1A and 3, where it is in position to be picked up by the lugs 172 of the rack advance conveyor 160. In the case of a five rack pull-out, as illustrated, the rearward end of conveyor 264 is disposed so that the lugs 290 will engage the sixth rack from the forward end of the closed loop, or as shown in FIGURE 1B, a rack occupying the position of rack 14m.

When the previously referred to five empty racks have progressed through the proofer to the position shown occupied by racks 14n, 14o, 14p, 14q and 14r in FIGURES 1A and 1B, and when a rack such as rack 14a has been elevated so that its lowermost shelf S-7 clears the top shelf of empty rack 14r, control means hereinafter described, effects energization of motor M-5 to initiate operation of the lower run conveyor 264, which will operate to deposit rack 14m of shorter proof time dough into the position shown occupied by rack 14r and divert empty racks 14n, 14o, 14p, 14q and 14r from the closed loop.

In order to permit the five empty racks to by-pass the elevator 32, a pair of hydraulic cylinders 292 are pivotally supported in suitable manner by inner frames F', one at each side of the proofer adjacent a respective track shoe 71. Referring to FIGURE 3 showing the arrangement at the left side of the proofer, it being understood that a similar arrangement is provided at the opposite side, the upper end of the reciprocative piston rod 294 of hydraulic cylinder 292 is pivotally connected to the free end of an arm 296 which is fixed at its other end to a rotatably mounted shaft 298 for rotating the same in opposite directions. Also fixed on shaft 298 is an arm 300, the free end of which is arranged to engage a projection 302 of the track shoe 71 for pivotally raising and lowering the same. Control means, hereinafter described, is provided for controlling the operation of the hydraulic cylinder 292 to raise the track shoe 71 when empty racks are being diverted, and to lower the track shoe 71 after the empty racks have been diverted from the closed loop, and also to raise the track shoe 71 when a rack is re-inserted into the closed loop and to lower the track shoe 71 after each rack has been re-inserted.

When air is admitted to the bottom of cylinder 292, the arm 300 is rotated in counterclockwise direction, thereby depressing the projection 302 and raising the track shoe to its phantom line position. When air is admitted to the upper end of cylinder 292, the arm 300 is rotated in clockwise direction to its position as shown in FIGURE 3, thereby permitting the track shoe to drop back to its full line position.

Admission of air from a suitable source of air under pressure selectively to the upper or lower end of cylinder 292 is controlled by any suitable well known type of two position selector valve (not shown). The control means for the selector valve whereby the above described pneumatic means operates to raise and lower the track shoe 71 at appropriate times, will be described hereinafter.

The speed of the lower run conveyor 264 is such that it will move rack 14m of shorter proof time dough into the position shown occupied by rack 14r in time to be picked up by the next operation of the rack advance conveyor 160. Thus rack advance conveyor 160 instead of picking up rack 14r, will now pick up rack 14m, so that rack 14m will have completed a round trip through the proofer in 52 minutes instead of 72 minutes.

The lower run conveyor 264 is arranged for intermittent operation, as hereinafter described, to advance successive empty racks into position to be engaged by an intermittingly operating auxiliary storage space conveyor 304. Conveyor 304 moves empty racks 14n, 14o, 14p, 14q and 14r to their phantom line position, as shown in FIGURE 1A, while the first rack of shorter proof time dough 14m is in position to be picked up by the next operation of the rack advance conveyor 160. After the five empty racks have been diverted, the track shoes 71 return to their down position, so that the first rack of shorter proof time dough will be retained in the closed loop. The control means for accomplishing this is hereinafter described in detail.

*Auxiliary storage conveyor*

The endless auxiliary conveyor 304 extends along the extension of lower tracks 56 with the upper run thereof disposed in a plane slightly above the plane of the tracks 56. The auxiliary conveyor 304 will now be described with particular reference to FIGURES 1A, 3 and 9A, which show the details thereof at the left side of the proofer, it being understood that they are duplicated at the opposite side of the proofer. Endless chain 306 of conveyor 304 is trained around tandem arranged rear and front sprockets 308 and 310, which sprockets are fixed on laterally inner extensions of respective stub shafts 312 and 314, which stub shafts are rotatably mounted in suitable bearings carried by the outer and inner frames F and F'. The endless chains 306 of conveyor 304 are driven in clockwise direction, as viewed in FIGURES 1A and 3, when introducing racks into storage space 58, and in counterclockwise direction when withdrawing racks from storage space 58, by a reversible gear head reduction motor M-6. The motor M-6 is disposed in the lower forward left side of the proofer housing 10 between outer and inner frames F and F'. The drive means includes a chain 316 trained around a sprocket 318 fixed on the output shaft of motor M-6 and a sprocket 320 fixed on the left hand end of a transversely extending through shaft 322, which shaft is suitably journaled in bearings carried by the framework of opposite sides of the proofer housing. A pair of chains 324 at opposite sides of the proofer are trained around sprockets 326 fixed on opposite ends of through shaft 322, and around sprockets 328 fixed on the stub shafts 314 of the conveyor 304 for operating the same.

The endless chains 306 of auxiliary conveyor 304 each carries a pair of radially outwardly projecting, diametrically opposed lugs 330 and 332. Now, in the above described example, when the five empty racks 14n, 14o, 14p, 14q and 14r have been successively pushed ahead to bring them in position to be engaged by the auxiliary conveyor 304, motor M-6 is energized to operate the conveyor 304 in clockwise direction, whereupon lugs 330 and 332 of endless chains 306 alternately engage the stub shafts 50 of the five empty racks to move them to the position shown in phantom in FIGURE 1A. When the lugs 330 and 332 are disengaged from the stub shafts of successive empty racks and reach the position shown occupied by lugs 332, one of the lugs 330 or 332 in said position engages and opens the normally closed limit switch LS-13, to stop the motor M-6, as hereinafter more particularly described with reference to the wiring diagram.

*Storage discharge conveyor*

The endless storage discharge conveyor 334 extends along the extension of lower tracks 56 with the upper run thereof disposed in a plane slightly above the plane of the tracks 56. The conveyor 334 will now be described with particular reference to FIGURES 1A and 9A which show the details, thereof at the left side of the proofer, it being understood that they are duplicated at the opposite side of the proofer. Endless chain 336 of conveyor 334 is trained around tandem arranged rear and front sprockets 338 and 340, the sprocket 338 being loosely mounted on the inner extension of a stub shaft 342 rotatably mounted in suitable bearings carried by the outer and inner frames F and F'.

Each of the endless chains 336 carries a radially outwardly projecting lug 358 which, in what will hereinafter be termed the "home" position of conveyor 334, are disposed in the position shown in FIGURE 1A. In the "home" position of conveyor 334, one of the lugs 358 is arranged to engage and hold open a normally closed limit switch LS-12. A reversible gear head reduction motor M-7 drives the endless chains 336 of conveyor 334 intermittently in counterclockwise direction whereby lugs 358 push the empty racks in storage ahead intermittently until a pre-selected number of racks, one or more, have been moved into position to be picked up by the auxiliary storage conveyor 304 for re-introduction into the closed loop; and drives the endless chains 336 in clockwise direction on a dry run back to the "home" position of the conveyor 334 when racks are introduced into the storage space 58. The control means for accomplishing this will be described hereinafter in detail.

The motor M-7 is disposed in the lower left side of the proofer auxiliary housing 24 between outer and inner frames F and F'. The drive means includes a chain 344 trained around a sprocket 346 fixed on the output shaft of motor M-7 and a sprocket 348 fixed on the left hand end of a transversely extending through shaft 350, which shaft is suitably journaled in bearings carried by the framework of opposite sides of the auxiliary housing 24. A pair of chains 352 in opposite sides of the housing 24 are trained around sprockets 354 fixed on opposite ends of through shaft 350, and around sprockets 356 fixed on the stub shafts 342 of the conveyor 334 for operating the same.

*In storage control means*

The means controlling the diversion of certain preselected racks 14 from the closed loop of the proofer into the storage space 58 includes a rectangular panel box 400 mounted in a suitably accessible position, being mounted in the present instance on the outside of the proofer front wall 36 adjacent the left hand side thereof, as diagrammatically shown in FIGURE 1A. Referring to FIGURES 12 and 13, the front wall 402 of the panel box 400 is provided with a circular opening 404 in which is disposed the selector disc 406. The selector disc 406 is securely fixed in suitable manner on the forward end of a rotatably mounted longitudinally extending shaft 408 which projects rearwardly through the panel box 400 into the proofer. As best shown in FIGURES 12 and 13, the shaft 408 is journaled in a flange type bearing 410 which is disposed within the panel box 400 and is secured in suitable manner, as by cap screws 412 and 414 to a rectangular mounting plate 416. The mounting plate 416 is disposed intermediate the panel box front and rear walls 402 and 418 in a plane parallel with the planes of the said panel box front and rear walls 412 and 418. Suitable means, such as cap screws 420 extend through the corner portions of the mounting plate 416 and are threaded into the ends of support rods 422, which rods are secured, as by welding, to the panel box rear wall 418 and extend therefrom inwardly of the panel box 400, as best shown in FIGURE 14. The end of the shaft 408 that projects into the proofer is journaled in a bearing 424 that is suitably secured to a bracket 426 carried by the proofer framework between outer and inner frames F and F', as best shown in FIGURE 11.

The disc shaft 408 is operated in timed relation with the elevator 32 through means now to be described with particular reference to FIGURES 1A and 11. An endless chain 428 is trained around a sprocket 430, see also FIGURE 2, securely fixed on the elevator stub shaft 64 at the left side of the proofer and around a sprocket 432 securely fixed on the input shaft 434 of a gear reducer 436 supported by a bracket, not shown, carried by the proofer framework between outer and inner frames F and F'. Another endless chain 440 is trained around a sprocket 442 securely fixed on the output shaft 444 of the gear reducer 436 and a sprocket 446 securely fixed on the disc shaft 408.

Extending through and slidably mounted in the disc 406 for movement normal to the plane thereof are a plurality of equidistantly spaced pins 448, arranged in a circle inwardly adjacent the periphery of the disc 406. Each of the pins 448 is provided with an outer circumferential stop member 450 and an inner circumferential stop member 452, limiting movement of the pins 448 in an "in" and an "out" direction. The number of pins 448 employed should equal at leat the number of racks in the system, eighteen in the present instance, plus the number of pins, one or more, covered by the cam 454, hereinafter referred to in greater detail. In the drawings the disc 406 is shown provided with twenty four pins 448, more than is necessary for an eighteen rack proofer, so that the same disc may be employed with a proofer of eighteen or more racks. The gear reduction between the elevator 32 and the disc 406 is such that upon elevation of a rack through a complete loading and unloading cycle, the disc 406 turns to move the pins 448 through one pin space, in other words, the distance between a pair of adjacent pins 448.

The pins 448, as hereinafter described, are arranged to indicate if a rack that has passed through the loading and unloading station 30 has at least one pan on any of its shelves or if that rack is completely empty. In order to correlate a rack position with a pin position, an indicium, such as the arrow 456, is placed on the panel box front wall 402 adjacent the periphery of disc 406 to represent a rack that has just passed through the loading and unloading station 30, in other words the lowermost shelf S-7 of a rack has just passed the loading conveyor 38. The disc 406 is so disposed on the shaft 408 that a pin 448 is in radial alinement with indicium 456 when a rack is in the aforesaid position. Consequently, with rack 14a in the position shown in FIGURE 1A (its bottom shelf S-7 being five rack shelf spaces below the loading conveyor 38), the pin 448 designated 448a will, with the disc 406 rotating in counterclockwise direction, be a proportional distance of a pin space below the indicium 456, as shown in FIGURE 12. If the rack that has just passed through the loading and unloading station has one or more pans on any of its shelves, the pin alined with indicium 456 is automatically pushed from its normal "in" position to its "out" position, and if the rack is empty, the pin will remain in its normal "in" position. Thus the operator by observing the pins on the disc can tell if corresponding racks carry pans or if they are empty and with indicium 456 as a point of reference can determine their location in the proofer.

The means for pushing the pins 448 to their "out" position includes a plunger 458 which extends through the mounting plate 416 and is axially slidably supported in a bushing 460 carried by the mounting plate 416, as best shown in FIGURE 14. The plunger 458 is disposed to be in axial alinement with a pin 448 when such pin is in radial alinement with the indicium 456. A helical spring 462 on plunger 458 disposed between the bushing 460 and a collar 464 fixed on the plunger 458 urges the latter to retracted position. A scanning means, including a light source and a photoelectric cell, not shown, is disposed at the infeed end of the loading conveyor 38, so that when the beam is broken by entry of a pan, a mechanically held relay is energized to prepare a circuit to the solenoid 466.

Referring to FIGURE 8, a disc 468 is mounted on the shaft 244, which shaft as previously explained makes one revolution for each elevation of a rack through a distance equal to the distance between the top and bottom shelf of a rack plus one additional rack shelf space. The disc 468 is provided with a node 470 disposed thereon so that when a rack, for example rack 14a of FIGURE 1A, has been elevated from the position shown to a position where its bottom shelf S-7 has just passed the loading conveyor 38, it engages and closes a normally open switch LS-6, thereupon completing the prepared circuit to the solenoid 466.

Energization of solenoid 466, which, as best shown in FIGURE 14, is suitably supported on mounting plate 416, causes its plunger 472 to move down. A bell crank lever 474, pivotally mounted in a bracket 476 supported on the rear wall 418 of panel box 400, has one of its arms pivotally connected to solenoid plunger 472 and the other of its arms pivotally connected to pin operating plunger 458, so that upon downward movement of the solenoid plunger, the pin operating plunger 458 is moved to extended position to push an alined pin 448 to its "out" position, to thereby indicate that the rack that has just passed through the loading and unloading station has at least one pan on at least one of its shelves. When the pin operating plunger 458 has reached its extended position, the bell crank lever engages and closes normally open switch LS-7. Closing of switch LS-7 releases the trip of the aforesaid mechanically held relay and since there is now no pan in the path of the scanning device, the mechanically held relay is de-energized to break the prepared circuit to and de-energize the solenoid 466. Upon de-energization of solenoid 466, the spring 462 moves the pin operating plunger 458 back to its retracted position, and through the bell crank 474 moves the solenoid plunger 472 back to its down position. Also, as the rack is raised by the elevator from the aforesaid position, the node 470 of disc 468 rides off switch LS-6 to re-open the same. This whole series of operations is now ready to be repeated as the next rack passes through the loading and unloading station. Thus, in the previously noted example, if the operator has permitted five empty racks to pass the loading and unloading station, by observing the disc 406 he will be apprised of the location of the five empty racks as they progress through the proofer.

Mounted on the mounting plate 416 are five normally open switches LS-30, LS-31, LS-32, LS-33 and LS-34, arranged in a circular arc and spaced a pin space apart. The contacts of these switches are disposed in the path of the pins 448 so as to be engaged to close a switch only by pins 448 in their "in" position, representing empty racks. With pin 448a in the position shown in FIGURE 12 representing rack 14a in the position shown in FIGURE 1A, as previously described, pin 448r in the position shown in FIGURE 12 will represent rack 14r in the position shown in FIGURE 1A. When rack 14a has been elevated from the position shown in FIGURE 1A to a position in which its bottom shelf S-7 clears the top shelf of rack 14r, or what will hereinafter be termed the rack "clearance line" position, pin 448a will have advanced a proportional distance of a pin space where it will still be somewhat below the line of the pin operating plunger 458 at indicia 456. Pin 448r will have advanced a similar proportional distance of a pin space, although rack 14r will have remained in the position shown in FIGURE 1A. Assuming now that racks 14n, 14o, 14p, 14q and 14r in FIGURES 1A and 1B are the empty racks which were permitted to pass by the loading and unloading station, through means to be described, the elevator 32 is arranged to stop in the aforesaid "clearance line" position of rack 14a. For a reason hereinafter to become apparent, switch LS-30 is disposed to coincide with the position reached by pin 448r when rack 14a reaches its aforesaid "clearance line" position. Switches LS-31, LS-32, LS-33 and LS-34 are disposed successive pin spaces rearwardly of switch LS-30, so that when pin 448a coincides with switch LS-30, the pins 448q, 448p, 448o and 448n will coincide with respective switches LS-31, LS-32, LS-33 and LS-34.

In order to automatically introduce these five empty racks into the storage space, the operator may at any time prior to arrival of the first empty rack into the position shown occupied by rack 14r, depress the five push buttons PV-5, PB-6, PB-7, PB-8 and PB-9, which are mounted in the front wall 478 of an auxiliary panel box 480. The panel box 480 may be mounted in any accesible position on or remote from the proofer, and is shown diagrammatically in FIGURE 1A. On respective push buttons PB-5 through PB-9, there are disposed respective indicia 1 through 5, indicating in that order the first through the fifth empty rack. Of course, if less than five empty racks had been permitted to pass the loading and unloading station, for example three, then only push buttons PB-5, PB-6 and PB-7 would be depressed. As will become apparent in the course of the description, the empty racks need not be consecutive racks. For example, assume two empty racks were permitted to pass the loading and unloading station, followed by two racks with pans and then followed by three empty racks, then by depressing the same five push buttons PB-5 through PB-9, only the five empty racks will be diverted while the two intervening racks with pans will complete the closed loop and be elevated by the elevator 32.

Referring particularly to the wiring diagram, FIGURE 15, and our specific example in which five empty racks are to be diverted, with push button PB-5 depressed a circuit is completed to and energizes control relay CR-42. Energization of control relay CR-42 closes its normally open contact CR-42a, so that upon release of push button PB-5, a circuit is maintained to control relay CR-42 through now closed contact CR-42a and a normally closed contact CR-51a of a control relay CR-51. In similar manner, with push buttons PB-6, PB-7, PB-8 and PB-9 depressed, control relays CR-43, CR-44, CR-45 and CR-46 are energized, and upon release of push buttons PB-6, PB-7, PB-8 and PB-9, the circuits are maintained to their respective control relays CR-43, CR-44, CR-45 and CR-46 by their respective contacts CR-43a, CR-44a, CR-45a and CR-46a, and their respective normally closed contacts CR-52a, CR-53a, CR-54a and CR-55a. The function of the control relays CR-51, CR-52, CR-53, CR-54 and CR-55 together with their contacts CR-51a, CR-52a, CR-53a, CR-54a and CR-55a will be described later in the description.

Energization of control relays CR-42, CR-43, CR-44, CR-45 and CR-46 also closes its normally opening contacts CR-42b, CR-43b, CR-44b, CR-45b and CR-46b. Let it be assumed now that rack 14r is the first of the five empty racks which were permitted to pass through the loading and unloading station. When rack 14a has been elevated to its aforesaid "clearance line" position, node 482 of cam disc 468, FIGURE 10, is arranged to engage and close a normally open limit switch LS-8 thereby energizing control relay CR-19. Referring to FIGURES 8 and 10, node 482 is offset laterally with respect to node 470, and limit switches LS-6 and LS-8 are disposed for engagement only by their respective nodes 470 and 482. Energization of control relay 19 closes its normally open contact CR-19a. When rack 14a has been elevated to its "clearance line" position, as just described, pin 448r (which is in its "in" position denoting an empty rack) will coincide with and close limit switch LS-30, as previously described. With limit switch LS-30 closed and with contact CR-42b of control relay CR-42 now closed, as above described, a circuit is completed to control relay CR-56. Energization of control relay CR-56 closes its normally open contact CR-56a.

Rack 14r, as shown in FIGURE 1A, or any rack in position 14r engages and holds closed a normally open limit switch LS-9 to thereby energize control relay CR-49. Energization of control relay CR-49 closes its normally open contact CR-49a. Now, with contacts CR-56a, CR- 49a and CR-19a closed, as described above, a circuit is completed to and energizes control relay CR-59. Energization of control relay CR-59 closes its normally open contact CR-59a, to maintain control relay CR-59 energized when contact CR-49a re-opens by reason of rack 14r, or any rack when in that position, being moved off the above referred to limit switch LS-9.

Energization of control relay CR-59 also closes its contact CR-59b completing a circuit to and energizing track shoe solenoid 484, for operating the previously referred to two position selector valve to effect introduction of air to the bottom of cylinders 292 for raising the track shoes 71, as previously described. In their raised position, track shoes 71 engage and hold closed the normally open limit switches LS-11a and LS-11b, thereby completing a circuit to and energizing control relay CR-58. Energization of control relay CR-58 closes its normally open contact CR-58a, and with contacts CR-56a and CR-59a closed, as described above, a circuit is completed to and energizes control relay CR-60.

Energization of control relay CR-58 also opens a normally closed contact CR-58b to de-energize control relay CR-22. De-energization of control relay CR-22 permits its normally open contact CR-22a to open to break the circuit to elevating and lowering motor M-1 and thereby stop the elevator 32 with the rack 14a at its "clearance line" position.

Energization of control relay CR-60 closes its normally open contact CR-60a completing a circuit through a normally closed contact CR-32a of a control relay CR-23 to motor M-5 and initiating operation of lower run conveyor 264. With lower run conveyor 264 operating, its lugs 290, as previously described, move the six racks 14m, 14n, 14o, 14p, 14q and 14r toward rack storage space 58 (track shoes 71 being now in their raised position) until the stub shaft 50 of rack 14r engages and closes a normally open limit switch LS-23. Switch LS-23 is located so as to be engaged when rack 14r is moved along tracks 56 below now elevated rack 14a in position to be engaged by lugs 330 of auxiliary conveyor 304. With switch LS-23 now held closed a circuit is completed to control relay CR-23 through contact CR-60b of control relay CR-60 (normally open contact CR-60b being closed at this time by reason of control relay CR-60 being energized, as just above described). Energization of control relay CR-23 opens its normally closed contact CR-23a, thereby breaking the circuit to and stopping lower run conveyor motor M-5.

Energization of control relay CR-23 also closes its normally open contact CR-23b and with a normally open contact CR-60c closed by energized control relay CR-60, a circuit is completed to and energizes control relay CR-76. Energization of control relay CR-76 closes its normally open contact CR-76a completing a circuit to operate reversible motor M-6 in reverse direction for operating auxiliary conveyor 304 in clockwise direction and thereby moving rack 14r from its position against limit switch LS-13 to the position in storage space 58 shown occupied in phantom by rack 14n.

Upon initiation of operation of auxiliary conveyor 304, its lug 332 moves off a normally closed limit switch LS-13 held open by lug 332, whereupon switch LS-13 closes to energize control relay CR-71. Energization of control relay CR-71 closes its normally open contact CR-71a, to retain control relay CR-23 energized upon re-opening of switch LS-23 when auxiliary conveyor lugs 330 have moved rack 14r away from limit switch LS-23. Auxiliary conveyor motor M-6 will therefore continue to run until auxiliary conveyor lug 330 engages and holds switch LS-13 open.

With rack 14r now moved to the position in storage space 58 shown occupied in phantom by rack 14n, switch LS-23 is now open, and since control relay CR-71 has been de-energized by re-opening of switch LS-13, contact CR-71a is now also re-opened, to thereby de-energize control relay CR-23. De-energization of control relay CR-76 effects re-opening of its contact CR-76a, breaking the circuit to motor M-6 and stopping auxiliary conveyor 304.

De-energization of control relay CR-23 effects re-closing of its normally closed contact CR-23a, and since contact CR-60a is closed by reason of control relay CR-60 still being energized, the circuit to motor M-5 is again completed to again initiate operation of lower run conveyor 264, so that now lower run conveyor 264 will again advance racks 14m, 14n, 14o, 14p and 14q.

This alternate operation of lower run conveyor 264 and auxiliary conveyor 304 is repeated as long as control relay CR-56 remains energized, as hereinafter explained. As hereinafter also explained, control relay CR-59 is de-energized when the five empty racks 14n, 14o, 14p, 14q and 14r reach their phantom line positions in FIGURE 1A, and the first rack of shorter proof time dough 14m reaches the position shown occupied by rack 14r.

With the five empty racks now in storage space 58 and in engagement with respective limit switches LS-15, LS-16, LS-17, LS-18 and LS-19 to close the same, control relays CR-51, CR-52, CR-53, CR-54 and CR-55 are energized. Energization of these relays opens the respective normally closed contacts CR-51a, CR-52a, CR-53a, CR-54a and CR-55a thereby breaking the circuit to respective control relays CR-42, CR-43, CR-44, CR-45 and CR-46 to de-energize the same. De-energization of these control relays opens their contacts CR-42b, CR-43b, CR-44b, CR-45b and CR-46b breaking the circuit to and de-energizing control relay CR-56.

Of course, had only three consecutive empty racks been permitted to pass through the loading and unloading station, it would only have been necessary to depress push buttons PB-5, PB-6 and PB-7 for diverting them into the storage space. In this event, of course, only three of the pins 448 will be in their "in" position, as previously explained. The circuit to control relay CR-56 (which must be energized in order to divert racks, as previously described) can not be completed until the three pins in their "in" position engage and close limit switches LS-30, LS-31 and LS-32, at which time the empty racks will be in positions 14p, 14q and 14r. Limit switches LS-33 and LS-34 will, of course, be open, since there are no pins 448 in "in" position to close them. When the three empty racks have been diverted, in the manner previously explained, they will engage and close limit switches LS-15, LS-16 and LS-17 and energize control relays CR-51, CR-52 and CR-53. Energization of control relays CR-51, CR-52 and CR-53 opens their normally closed contacts CR-51a, CR-52a and CR-53a and de-energize control relays CR-42, CR-43 and CR-44. De-energization of control relays CR-42, CR-43 and CR-44 causes their normally open contacts CR-42b, CR-43b and CR-44b to re-open, thereby breaking the circuit to control relay CR-56 so that no further racks can be diverted.

When the selected number of empty racks have been introduced into storage space 58, as above described, and with control relay CR-56 de-energized, the elevator 32 is again started, as will now be described, with particular reference to the wiring diagram.

De-energization of control relay CR-56 re-opens its contact CR-56a thereby breaking the circuit to and de-energizing control relay CR-59, as well as control relay CR-60. De-energization of control relay CR-59 effects re-opening of its contact CR-59b, thereby de-energizing track shoe control solenoid 484, to position the previously referred to two position selector valve to effect introduction of air into the top of cylinders 292 for lowering the track shoes 71. Lowering of the track shoes 71 effects re-opening of track shoe switches LS-11a and LS-11b to de-energize control relay CR-58. De-energization of control relay CR-58 effects re-closing of its normally closed contact CR-58b, completing the circuit to and energizing control relay CR–22. Energization of control relay CR–22 closes its normally open contact CR–22a, completing the circuit to and restarting the elevator motor M–1.

With the elevator 32 running again, the rack at the "clearance line" position will again be elevated to complete its loading and unloading cycle. As explained in the description of the operation of the proofer with a full complement of racks, when node 262 of cam disc 252 engages limit switch LS–4, motor M–2 is operated, whereby full rack 14m (which followed the five empty racks and is now in the position shown occupied by rack 14r) is engaged by rack advance conveyor 260 and is moved along lower tracks 56 and now lowered track shoes 71 in position to be picked up by the elevator 32. Initial movement of the said full rack 14m by rack advance conveyor 260, causes rack 14m or any rack with pans when in the position shown occupied by rack 14r to move off normally open limit switch LS–9. Upon opening of limit switch LS–9, the circuit to control relay CR–49 is broken.

De-energization of control relay CR–49 permits its normally closed contact CR–49b to re-close. A circuit is now completed through closed contact CR–49b, a normally closed contact CR–57a of a control relay CR–57 and contact CR–22b (which is now closed as a result of energization of its control relay CR–22), to lower run conveyor motor M–5. Lugs 290 of lower run conveyor 264 will now pick up rack 141 (rack 141 having by this time been advanced to the position shown occupied by rack 14m), and advance it through the space vacated by racks 14m, 14n, 14o, 14p and 14q and deposit it in the space vacated by rack 14r. When rack 141 is deposited in the space vacated by rack 14r, it will engage and close limit switch LS–9, thereby energizing control relay CR–49. Energization of control relay CR–49 re-opens normally closed contact CR–49b, thereby re-opening the circuit to and stopping lower run conveyor motor M–5. When rack 141 is then picked up by the next operation of the rack advance conveyor 260, the cycle of events is repeated so that one rack after another is advanced through the vacated space and is raised through the loading and unloading station by the elevator 32.

It will be seen that the racks of shorter proof time dough which were allowed to follow the five empty racks, now complete the circuit through the proofer in a shorter period of time than when there was a full complement of racks in the closed circuit resulting in a shorter proof time.

As above described one or any number of successive empty racks up to five can be diverted from the closed loop into the storage space 58. In still another situation, assume as an example, that the bakers production run calls for a first run of long proof time dough, followed by a second run of shorter proof time dough, such as would require two empty racks to be diverted into the storage space 58, followed by a third run of still shorter proof time dough, such as would require two additional empty racks to be diverted into the storage space 58. Assume now that operation of the proofer is started with a full complement of racks in the closed loop. When the proofer is filled with racks of the first or longest proof time dough run, the operator can even at this early stage make his selection to introduce the empty racks into the storage space, in other words he does not have to wait until the empty racks are in the proofer to make his selection. This he does by depressing the push buttons PB–5, PB–6, PB–7 and PB–8, thereby energizing control relays CR–42, CR–43, CR–44 and CR–45 and closing their normally open contacts CR–42b, CR–43b, CR–44b and CR–45b. However, since limit switches LS–30, LS–31, LS–32 and LS–33 are open, as are also contacts CR–51b, CR–52b, CR–53b and CR–54b of control relays CR–51, CR–52, CR–53 and CR–54, control relay CR–56 remains de-energized. With control relay CR–56 de-energized and with control relay CR–58 de-energized because track shoe switches LS–11a and LS–11b are open neither the lower run conveyor 260 nor the auxiliary conveyor 304 can operate to divert any of the racks.

Now, at the conclusion of the first run of dough, all the operator need do is to permit two empty racks to pass by the loading and unloading station. As previously explained, this automatically causes two successive pins 448 of selector disc 406 to remain in their "in" positions, so that when the two empty racks reach positions 14r and 14q, their corresponding pins which were retained in "in" position will coincide with and close limit switch LS–30 and LS–31, completing the circuit to and energizing control relay CR–56. In the manner previously described, the two empty racks are diverted into storage space 58 where they will engage and close limit switches LS–15 and LS–16 to thereby energize control relays CR–51 and CR–52. Energization of control relays CR–51 and CR–52 effects re-opening of contacts CR–51a and CR–52a breaking the circuit to and de-energizing control relays CR–42 and CR–43, whereupon contacts CR–42b and CR–43b re-open to break the circuit to control relay CR–56. The contacts CR–44b and CR–45b are, at this time, still closed, but since limit switches LS–32 and LS–33 are open (there being no pins 448 in "in" position engaging these switches) and since contacts CR–53b and CR–54b are open (their control relays CR–53 and CR–54 being de-energized as there are no racks in storage engaging and closing limit switches LS–17 and LS–18), the circuit to control relay CR–56 remains broken. Then, in the manner previously explained, the racks with pans of the second run of dough will now run through the closed loop of the proofer.

At the conclusion of the second run of dough, all the operator need do is to permit two empty racks to pass by the loading and unloading station. Two successive pins 448 will again remain in their "in" position denoting empty racks, so that with two racks already in storage, when these pins coincide with and engage switches LS–32 and LS–33, at which time the empty racks will be in positions 14r and 14q, a circuit is again completed to and energizes control relay CR–56. This circuit will be through still re-closed contacts CR–44b and CR–45b, now closed limit switches LS–32 and LS–33, and closed contacts CR–52b and CR–51b (these latter contacts being closed by reason of the two racks in storage being in engagement with and closing limit switches LS–16 and LS–15 to thereby energize control relays CR–52 and CR–51). In the manner previously explained, the second pair of empty racks are now also diverted into storage compartment 58, and the racks with pans of the third run of dough will now run through the closed loop of the proofer, with the lower run conveyor 264 operating to advance the racks through the space vacated by the four diverted racks.

As above described, the pins 448 of the disc 406, when retained in their "in" position, denoting empty racks, function together with the described means to effect diversion of the empty racks into the storage space 58. The pins 448 which were pushed to their "out" position denoting racks having one or more pans will, after passing pin position 448r and before reaching pin position 448a, be pushed back to their normal "in" position as they pass beneath the cam 454. By manually pulling a pin that remained in "in" position, denoting a rack to be diverted, to its "out" position, the operator can cancel the diversion of the rack corresponding to such pin. This may be done at any time prior to arrival of the cancelled rack at position 14r.

*Racks from storage*

As above described, by diverting one, two, three, four or five empty racks from the closed loop into the rack storage space 58, the proofing time of successive runs of dough may be incrementally decreased. Now, by re-inserting one or more racks from storage space 58 into the closed loop, the proofing time of successive runs of dough may be incrementally increased. Assuming for purpose of illustration that there are five empty racks in storage space 58, as shown in phantom in FIGURE 1, and it is desired to re-insert three of these racks into the closed loop to provide a desired incremental increase in the proof time of a particular product run, following a shorter proof time product run such as, for example, required five empty racks in storage space 58, this may be accomplished by the means and controls now to be described.

For this purpose, referring particularly to FIGURES 12 and 13, a plurality of pins 500 extend through and are slidably mounted in the disc 406 for movement normal to the plane thereof. The pins 500 are equal in number to previously described pins 448, and are equidistantly spaced in a circle concentric with and disposed inwardly of the circle of pins 448, each pin 500 being radially alined with a respective pin 448. The construction and mounting of the pins 500 is identical with that of the pins 448 and in similar manner have limited movement in an "in" and an "out" direction, being normally disposed in their "out" positions.

When the first of the run of longer proof time dough is being delivered onto a rack passing through the loading station, and referring to FIGURE 1A for purpose of illustration, let us assume that this is rack 14a, the operator can orient this rack on the selector disc 406 since, as previously described, the reference indicia 456 indicates a rack in the loading station. Pin 500a would therefore represent rack 14a which is passing through the loading station and on which the longer proof time dough is being loaded, and pin 500b would represent the last rack of short proof time dough, which rack will now be in position 14b. The operator now depresses pin 500b representing the last rack of short proof time dough, so that through the control means to be described, the desired number of empty racks are re-introduced into the closed loop between the last rack of short proof time dough and the first rack of longer proof time dough.

If the dough make-up system employed in a particular bakery is such that there is a break between the run of short proof time dough and the run of longer proof time dough, and one or more empty racks pass through the loading station, then as previously described the outer pins 448 corresponding to these empty racks would remain in their normal "in" position. Now, by observing the disk 406 the operator can orient the empty racks and by manually pushing the pin 500 to its "in" position that is alined with the last pin 448 in its "in" position, the desired number of empty racks are re-inserted into the closed loop between the last empty rack that passed through the loading station and the first rack of longer proof time dough.

In order to re-insert the desired number of racks from storage space 58 into the closed loop, the operator depresses one of the five push buttons PB–11, PB–12, PB–13, PB–14 and PB–15. These push buttons are conveniently mounted in the front wall 478 of the auxiliary panel box 480, and associated with them are respective indicia L–0, L–1, L–2, L–3 and L–4 indicating the number of racks that are to be left in storage when its associated push button is depressed. Thus in our above supposititious case, to re-insert three racks (leaving two in storage), the operator depresses push button PB–13. Of course, if there had been only four racks in storage space, then to re-insert three racks (leaving one in storage), the operator would have depressed push button PB–12.

Referring to the wiring diagram and to FIGURE 1A, with five racks in storage space 58 engaging and holding closed normally open limit switches LS–15, LS–16, LS–17, LS–18 and LS–19, thereby energizing respective control relays CR–51, CR–52, CR–53, CR–54 and CR–55, normally open contacts CR–51c, CR–52c, CR–53c, CR–54c and CR–55c are all closed. Now, with contact CR–53c closed and push button PB–13 depressed, a circuit is completed to and energizes control relay CR–38. Energization of control relay CR–38 closes normally open contact CR–38a to maintain control relay CR–38 energized when push button PB–13 is released. Energization of control relay CR–38 also closes normally open contact CR–38b. With control relays CR–51, CR–52, CR–53, CR–54 and CR–55 energized, as above described, their respective normally open contacts CR–51d, CR–52d, CR–53d, CR–54d and CR–55d are also closed.

Now, when the racks have advanced through the proofer and the lower run conveyor 264 has advanced the last rack of short proof time dough through the space vacated by the racks in storage space 58 into position 14r engaging limit switch LS–9 and thereby stopping the lower run conveyor 264, as previously described, the pin 500 corresponding to that rack, which pin was depressed to its "in" position, engages and closes limit switch LS–35. The first rack of longer proof time dough will at this time be in position 14l.

Referring to the wiring diagram, with limit switch LS–35 closed, contact CR–55d closed as explained above, and contact CR–49c closed by reason of control relay CR–49 being energized, a circuit is completed to and energizes control relay CR–57. Energization of control relay CR–57 closes its normally open contact CR–57b. With contact CR–57b closed a circuit is completed to and energizes control relay CR–74. It also closes its normally open contact CR–57c completing a circuit through a normally closed contact CR–31b to and energizing latch control relay LCR–78. Energization of latch control relay LCR–78 holds its contact LCR–78a closed to retain control relay CR–57 energized when the pin 500 that engaged limit switch LS–35 rides off and effects re-opening of switch LS–35 and when contact CR–49c re-opens upon rack in position 14l being moved off limit switch LS–9.

The rack in position 14a is at this time being elevated through the loading and unloading station, and as previously described, when it reaches a position where its lowermost shelf S–7 is approximately ⅓ of a rack shelf space below its unloading position, node 254 of cam disc 252 engages and closes limit switch LS–4 completing a circuit through now closed contact CR–49d to and energizing control relay CR–31. Energization of control relay CR–31 closes its contact CR–31a to start motor M–2 and operate rack advance conveyor 160 to move the last rack of short proof time dough from position 14l to a position beneath the preceding rack in readiness to be picked up by the elevator, in the manner previously described.

Normally, as previously described, when a rack is moved off limit switch LS–9 from position 14l, the lower run conveyor 264 operates to advance a succeeding rack into position 14l. However, in the present instance with empty racks being returned from storage space 58 into the closed loop, control relay CR–57 is held energized, so that its normally closed contact CR–57a is open, and since contact CR–60a of control relay CR–60 is also open, the circuit to lower run conveyor motor M–5 remains broken.

When the last rack of short proof time dough and the preceding rack, both of which are now in the elevator, have been elevated a distance to complete loading of the preceding rack, the node 262 of cam disc 252 engages and closes limit switch LS–4, in the manner previously described to again actuate motor M–2 and operate rack discharge conveyor 146 to move the said preceding rack into position 14b. All the racks in the proofer will now be moved ahead a rack space, so that the first rack of longer proof time dough will be in position 14m.

When the last rack of short proof time dough has been further elevated to its "clearance line" position, node 482 of cam disc 468, FIGURE 10, engages and closes normally open limit switch LS–8, thereby energizing control relay CR–19. Energization of control relay CR–19 closes its normally open contact CR–19b and, since contacts CR–38b, CR–57b, CR–24a, CR–74a, CR–49e are closed at this time, a circuit is completed to and energizes control relay CR–41.

Energization of control relay CR–41 closes its normally open contact CR–41a, completing a circuit to and energizing track shoe solenoid 484 whereby, as previously described, the track shoes 71 are raised. Raising of the track shoes 71 holds limit switches LS–11a and LS–11b closed to thereby energize control relay CR–58. Energization of control relay CR–58 opens its normally closed contact CR–58b to de-energize control relay CR–22. De-energization of control relay CR–22 effects re-opening of its normally open contact CR–22a, thereby breaking the circuit to rack elevating and lowering motor M–1 with the aforesaid last rack of short proof time dough at its "clearance line" position.

With a normally closed contact 62a being closed at this time, and with normally open contact CH–41b being closed by reason of control relay CR–41 being energized as above described, and with normally closed contact CR–71b of control relay CR–71 being closed at this time, a circuit is completed to reversible storage conveyor motor M–7 to operate storage conveyor 334 in counterclockwise direction, as viewed in FIGURE 1A, whereby lugs 358 move all the empty racks in storage toward the auxiliary conveyor 304. When the empty rack in phantom line position 14n has advanced to a position where it can be picked up by the auxiliary conveyor 304, it engages and closes limit switch LS–22 to thereby energize control relay CR–62. Energization of control relay CR–62 opens its normally closed contact CR–62a to break the circuit to and stop reversible storage conveyor motor M–7.

Energization of control relay CR–62 also closes its normally open contact CR–62b and energizes control relay CR–23. Energization of control relay CR–23 closes its normally open contact CR–23b, and with normally open contact CR–41c being closed by reason of control relay CR–41 being energized, and with normally closed contact CR–31c being closed by reason of control relay CR–31 being de-energized, a circuit is completed to and energizes control relay CR–75. Energization of control relay CR–75 closes its normally open contact CR–75a to complete the circuit to auxiliary conveyor motor M–6 to operate auxiliary conveyor 304 in counterclockwise direction, as viewed in FIGURE 1A, whereby lugs 332 engage and move the empty rack from its position against limit LS–22 toward a position against and closing a normally open limit switch LS–28.

Upon initiation of operation of auxiliary conveyor 304, its lug 332 moves off normally closed limit switch LS–13 causing limit switch LS–13 to close and energize control relay CR–71. Energization of control relay CR–71 closes its normally open contact CR–71a completing a circuit to and maintaining control relay CR–23 energized when the empty rack moves off limit switch LS–22 to thereby de-energize control relay CR–62 and re-open its contact CR–62b. Thus, with control relay CR–23 retained energized, auxiliary conveyor 304 will continue to run until its lugs 330 engages and opens limit switch LS–13, breaking the circuit to and de-energizing control relay CR–71, thereby re-opening contact CR–71a and de-energizing control relay CR–23, at which time the empty rack will have been moved into a position engaging limit switch LS–28.

Also, when the lug 332 moved off normally closed limit switch LS–13 causing it to close and energize control relay CR–71, normally closed contact CR–71 re-opened, so that when contact CR–62a re-closed as a result of the empty rack being moved off normally open limit switch LS–22 and de-energizing control relay CR–62, the circuit to storage conveyor motor M–7 remained open to retain storage conveyor 334 immobilized while auxiliary conveyor 304 was running.

When the empty rack has moved to a position engaging and closing normally open limit switch LS–28, as above described, control relay CR–24 is energized. Energization of control relay CR–24 opens its normally closed contact CR–24a thereby opening the circuit to and de-energizing control relay CR–41. De-energization of control relay CR–41 re-opens its normally open contact CR–41a to thereby de-energize track shoe solenoid 484, whereby through the means previously described the track shoes 71 are lowered. Lowering of the track shoes 71 opens limit switches LS–11a and LS–11b to thereby de-energize control relay CR–58. De-energization of control relay CR–58 re-closes its normally closed contact CR–58b to energize control relay CR–22. Energization of control relay CR–22 re-closes its contact CR–22a, completing the circuit to rack elevator and lowering motor M–1, so that the last rack of short proof time dough moves upwardly from its "clearance line" position.

Closing of limit switch LS–28, by reason of engagement therewith of the empty rack, thereby energizing control relay CR–24 as above described, also closes its normally open contact CR–24b. Now, when the last rack of short proof time dough has been elevated to a position where its lowermost shelf is approximately ⅓ of a rack shelf space below its unloading position, the node 254 of cam disc 252 (FIGURE 8) again engages and closes normally open limit switch LS–4, thereby completing the circuit to and energizing control relay CR–31, whereupon contact CR–31a closes to start motor M–2 and operate the rack advance conveyor 160 on a rack advancing run to bring the empty rack up into position to be picked up by the elevator 32 in the manner previously described in the operation of the proofer with a full complement of racks.

The empty rack is now elevated through the loading and unloading station, as well as the preceding rack from which the last of the short proof time dough has been unloaded and onto which longer proofer time dough has been loaded. When this preceding rack has been elevated to the position where node 262 of cam disc 252 now engages and again closes limit switch LS–4, motor M–2 is again operated and, in the manner previously described, rack discharge conveyor 146 operates to move the said preceding rack into the position shown occupied by rack 14b.

All the racks will now have been advanced a rack space, so that the first rack of longer proof time dough will be in position 14n. When the empty rack that was re-introduced into the closed loop has been elevated through the loading and unloading station to its "clearance line" position, control relay CR–19 is energized to again close contact CR–19b and energize control relay CR–41, as above described, whereupon the described cycle of events is repeated to introduce the second empty rack into the closed loop, and when the second empty rack reaches its "clearance line" position, the first rack of longer proof time dough will be in position 14o.

In the manner previously described, the storage conveyor 334 and the auxiliary conveyor 304 operate to move the fourth and fifth empty racks ahead to the position of phantom racks 14n and 14o and the third empty rack to its position against limit switch LS–28. Since there are now no empty racks engaging normally open limit switches LS–17, LS–18 and LS–19, control relays CR–53, CR–54 and CR–55 are de-energized. With control relay CR–53 de-energized, its normally open contact CR–53c re-opens to break the circuit to control relay CR–38. De-energization of control relay CR–38 re-opens its contact CR–38b, breaking the circuit to control relay CR–74. De-energization of control relay CR–74 permits its normally closed contact CR–74b to re-close. With the third empty rack engaging limit switch LS–28 to thereby energize control relay CR–24, the elevator is re-started as previously described, and at the same time contact CR–24b is closed.

When the second empty rack has now been elevated from its clearance line position to the position where node 254 of cam disc 252 engages and closes limit switch LS–4 to start rack advance conveyor 160 and advance the third empty rack to the elevator beneath the second empty rack, the circuit through limit switch LS–4 and contact CR–24b is completed to and energizes control relay CR-31. Through previously described cam limit switch LS-5, the circuit to control relay CR-31 is maintained when cam limit switch LS-4 and contact CR-24b re-open. Energization of control relay CR-31 closes its contact CR-31d, and with contact CR-74b closed a circuit is completed to unlatching coil UCR-78 of control relay CR-78, so that with contact CR-31b now open, latch control relay CR-78 is de-energized permitting contact LCR-78a to re-open and thereby de-energize control relay CR-57.

With control relay CR-57 de-energized, no further racks are now re-inserted from storage into the closed loop and the proofer will now operate in the manner previously described with five racks in the storage space 58, except that now there will be only two racks in storage and three racks will have been inserted into the closed loop, so that the racks of the second run of dough are now advanced by the lower run conveyor 264 through two vacated rack spaces instead of five to provide a longer proof time for the second run of dough.

If this second run of dough is to be followed by a third run of dough requiring a still longer proof time, such as would for example require insertion of an additional rack in the closed loop, the operator depresses push button PB-12 to leave one rack in storage. Since there is a rack in storage holding limit switch LS-16 closed, control relay CR-52 is energized and its contact CR-52c is closed, so that upon depression push button PB-12, control relay CR-37 is energized and is retained energized through its now closed contact CR-37a, when push button PB-12 is released.

Energization of control relay CR-37 also closes its normally open contact CR-37b. When the last rack of the second run of dough has passed the loading station, the operator now pushes the pin 500 corresponding to that rack to its "in" position. Now when the last rack of the second run of dough reaches position 14r, thereby engaging and closing limit switch LS-9, control relay CR-49 is energized and closes contact CR-49c. At such time its corresponding pin 500, which was pushed to "in" position, will engage and close limit switch LS-38, and since contact CR-52d is closed by reason of control relay CR-52 being energized, and with contact CR-49a closed, the circuit to control relay CR-57 is again completed. In the manner previously explained, another empty rack is now re-inserted into the closed loop, and the third run of dough will receive a longer proof time.

As above described, the pins 500 of the disc 406, when pushed to their "in" position, function together with the above described means to effect re-insertion of racks from storage space 58 into the closed loop. Upon continued rotation of disc 406, after the "in" pushed pin has completed its function, it will be pushed back to its normal "out" position as it passes beneath the cam 502.

While, for purpose of illustration, a group of three empty racks was re-inserted from storage into the closed loop, followed by a single rack, the racks of course may be re-inserted in other numbers. For example, if five runs of dough requiring successively longer proof times were to be introduced into the proofer, than only one empty rack would be re-inserted following each run of dough.

I claim:

1. In an article treating apparatus, a plurality of article carriers having vertically spaced shelves, means for conducting a succession of carriers in a closed loop including a pair of vertically spaced upper and lower track means and elevating and lowering means respectively disposed at opposite ends of said track means, a pair of vertically spaced article supports disposed exteriorly of said closed loop between the upper and lower ends of said elevating means and in the proximity of the path of the article carriers being elevated thereby, said lower track means having track extensions projecting from said closed loop in spaced relation below said article supports, track shoe means adjacent the lower end of said elevating means movable between a position for guiding carriers in said closed loop from said lower track means to said elevating means and a position permitting carriers to be moved from said lower track means onto said track extension out of said closed loop beneath said article support means.

2. In an article treating apparatus, a plurality of article carriers having vertically spaced shelves, means for conducting a succession of carriers in a closed loop including a pair of vertically spaced upper and lower track means and elevating and lowering means disposed respectively at opposite ends of said track means for transferring said carriers from one to the other of said track means, a pair of vertically spaced article supports disposed exteriorly of said closed loop between the upper and lower ends of said elevating means proximate the path of the article carriers being elevated thereby, said lower track means having track extensions projecting from said closed loop in spaced relation beneath said article supports, track shoe means in said closed loop adjacent the lower end of said elevating means movable between a position for guiding carriers in said closed loop from said lower track means to said elevating means and a position permitting diversion of carriers from said closed loop onto said track extensions and re-insertion of carriers from said track extensions into said closed loop, conveying means extending along said lower track means within said closed loop engageable with a succeeding carrier for diverting a preceding carrier from said closed loop onto said track extensions, and reversibly operable conveying means extending along said track extensions arranged for operation in one direction for transporting a carrier along said track extensions from said diverted position to a position out of the path of travel of a carrier in said closed loop and for operation in the opposite direction for re-inserting a carrier from said track extensions into said closed loop.

3. In an article treating apparatus, a plurality of article carriers having vertically spaced shelves, means for conducting a succession of carriers in a closed loop including a pair of vertically spaced upper and lower track means and carrier elevating and lowering means respectively disposed at opposite ends of said track means, a pair of vertically spaced article supports disposed exteriorly of said closed loop between the upper and lower ends of said elevating means proximate the path of carriers being elevated thereby, said lower track means having extensions projecting from said closed loop in spaced relation below said article supports, track shoe means in said closed loop adjacent the lower end of said elevating means mounted for movement between a first position for guiding carriers in said closed loop from said lower track means to said elevating means and a second position permitting diversion of carriers from said closed loop onto said track extensions, motive means for operating said track shoe means, conveying means extending along the forward portion of said lower track means adapted to divert a carrier from said closed loop onto said track extensions when said track shoe means are in said second position, motive means for said conveying means, means for selecting desired carriers for diversion, control means responsive to said selecting means each time a desired carrier to be diverted has been advanced to the forward end of said lower track means of said closed loop for energizing said track shoe motive means to move said track shoe means to said second position, and control means responsive to movement of said shoe means to said second position for energizing said conveying means motive means to divert said selected carriers from said closed loop onto said track extensions.

4. In an article treating apparatus, a plurality of article carriers having vertically spaced shelves, means for conducting a succession of carriers in a closed loop including a pair of vertically spaced upper and lower track means and carrier elevating and lowering means respectively disposed at opposite ends of said track means, a pair of vertically spaced article supports disposed exteriorly of said closed loop between the upper and lower ends of said elevating means proximate the path of carriers being elevated thereby, said lower track means having extensions projecting from said closed loop in spaced relation below said article supports, track shoe means in said closed loop adjacent the lower end of said elevating means mounted for movement between a first position for guiding carriers in said closed loop from said lower track means to said elevating means and a second position permitting diversion of carriers from said closed loop onto said track extensions, motive means for selectively moving said track shoe means between said first and second named positions, conveying means extending along the forward portion of said lower track means adapted to divert a carrier from said closed loop onto said track extensions when said track shoe means are in said second position, motive means for said conveying means, a series of selector members movable in timed relation with said elevating means arranged to be individually conditioned for effecting diversion of selected carriers from said closed loop, control means responsive to a conditioned selector when its corresponding selected carrier has been advanced to the forward end of said lower track means of said closed loop for energizing said track shoe motive means to move said track shoe means to said second position, and control means responsive to movement of said track shoe means to said second position for energizing said conveying means motive means to divert said selected carrier from said closed loop onto said track extensions.

5. Apparatus in accordance with claim 4, including a second conveying means extending along said track extensions and motive means therefor, and control means responsive to movement of a selected carrier to said diverted position for energizing said second conveying means motive means to move said selected carrier from said diverted position along said track extensions out of the path of travel of a carrier in said closed loop.

6. Apparatus in accordance with claim 4, including control means responsive to movement of said track shoe means to said second position for interrupting operation of said elevating means.

7. In an article treating apparatus, a plurality of article carriers having vertically spaced shelves, means for conducting a succession of carriers in a closed loop including a pair of vertically spaced upper and lower track means and carrier elevating and lowering means respectively disposed at opposite ends of said track means, a pair of vertically spaced article supports disposed exteriorly of said closed loop between the upper and lower ends of said elevating means proximate the path of carriers being elevated thereby, said lower track means having extensions projecting from said closed loop in spaced relation below said article supports, track shoe means in said closed loop adjacent the lower end of said elevating means mounted for movement between a first position for guiding carriers in said closed loop from said lower track means to said elevating means and a second position permitting diversion of carriers from said closed loop onto said track extensions, motive means for selectively moving said track shoe means between said first and second named positions, conveying means extending along the forward portion of said lower track means adapted to divert a carrier from said closed loop onto said track extensions when said track shoe means are in said second position, motive means for said conveying means, a series of selector members movable in timed relation with said elevating means arranged to be individually conditioned for effecting diversion of selected carriers from said closed loop, control means responsive to a conditioned selector when its corresponding selected carrier has been advanced to the forward end of said lower track means of said closed loop and elevation of a preceding carrier by said elevating means through a distance such that its lower end is at a level above the level of the upper end of said selected carrier for energizing said track shoe motive means to move said track shoe means to said second position, and control means responsive to movement of said track shoe means to said second position for energizing said conveying means motive means to divert said selected carrier from said closed loop onto said track extensions.

8. In an article treating apparatus, a plurality of article carriers having vertically spaced shelves, means for conducting a succession of carriers in a closed loop including a pair of vertically spaced upper and lower track means and elevating and lowering means respectively disposed at opposite ends of said track means for transferring said carriers from one to the other of said track means, a pair of vertically spaced article supports disposed exteriorly of said closed loop between the upper and lower ends of said elevating means proximate the path of the article carriers being elevated thereby, said lower track means having track extensions projecting from said closed loop in spaced relation below and beyond said article supports, track shoe means adjacent the lower end of said elevating means movable between a lowered position for guiding carriers in said closed loop from said lower track means to said elevating means and a raised position permitting racks to be diverted from said closed loop onto said track extensions, first conveying means extending along said lower track means rearwardly from said track shoe means having rack engaging means engageable with a rack rearward of a rack disposed in said closed loop adjacent said track shoe means to push said last named rack out of said closed loop onto said track extension when said track shoes are in their raised position, and second conveying means disposed along said track extension having rack engaging means engageable with a rack that has been moved onto said track extension by said first named conveyor for moving said rack along said track extension out of the path of movement of racks in said closed loop.

9. An apparatus in accordance with claim 8 including operating means for said first and second conveying means and control means therefor for alternately operating said first and second conveying means to divert a selected number of article carriers.

10. In an article treating apparatus, a plurality of article carriers having vertically spaced shelves, means for conducting a succession of carriers in a closed loop including a pair of vertically spaced upper and lower track means and elevating and lowering means respectively disposed at opposite ends of said track means, a pair of vertically spaced article supports disposed exteriorly of said closed loop between the upper and lower ends of said elevating means proximate the path of the article carriers being elevated thereby defining a loading and unloading station for transfer of articles between the shelves of said article carriers and said article supports, said lower track means having track extensions projecting from said closed loop in spaced relation below and extending beyond said article supports, conveying means extending along the lower track means of said closed loop and along said track extensions for diverting carriers out of said closed loop and the path of the carriers in said closed loop, pre-settable control means for conditioning an electrical circuit for controlling diversion of a desired number of carriers, pre-selecting means operable in timed relation with said elevating means for selecting certain carriers for diversion, second control means including switch means in said conditioned circuit operated by said pre-selecting means for completing said conditioned circuit to divert said certain carriers, and third control means including switch means operated by diverted carriers for rendering said pre-settable control means ineffectual for conditioning said electrical circuit when the desired number of carriers have been diverted.

11. In an article treating apparatus, a plurality of article carriers having vertically spaced shelves, means for conducting a succession of carriers in a closed loop including a pair of vertically spaced upper and lower track means and elevating and lowering means respectively disposed at opposite ends of said track means, a pair of vertically spaced article supports disposed exteriorly of said closed loop between the upper and lower ends of said elevating means proximate the path of the article carriers being elevated thereby defining a loading and unloading station for transfer of articles between the shelves of said article carriers and said article supports, said lower track means having track extensions projecting from said closed loop in spaced relation below and extending beyond said loading and unloading station, conveying means extending along the lower track means of said closed loop and along said track extensions for diverting racks out of said closed loop and the path of the racks in said closed loop, track shoe means at the forward end of said lower track means of said closed loop movable between a lowered position for guiding carriers in said closed loop from said lower track means to said elevating means and a raised position permitting carriers to be diverted from said closed loop onto said track extensions, pre-settable control means for conditioning an electrical circuit for controlling diversion of a desired number of carriers, pre-selecting means operable in timed relation with said elevating means for selecting certain carriers for diversion, second control means including switch means in said conditioned circuit to divert said certain carriers, third control means including switch means operated by diverted carriers for rendering said pre-settable control means ineffectual for conditioning said electrical circuit when the desired number of carriers have been diverted, means for operating said track shoe means, and control means for said track shoe operating means responsive to completion and interruption of said conditioned electrical circuit for raising and lowering said track shoe means.

12. An article treating apparatus in accordance with claim 11, including operating means normally operating said elevating means, and control means responsive to raising of said track shoe means for interrupting operation of said elevating means operating means.

13. In an article treating apparatus, a plurality of article carriers having vertically spaced shelves, means for conducting a succession of carriers in a closed loop including a pair of vertically spaced upper and lower track means and elevating and lowering means respectively disposed at opposite ends of said track means for transferring said carriers from one to the other of said track means, a pair of vertically spaced article supports disposed exteriorly of said closed loop between the upper and lower ends of said elevating means proximate the path of the article carriers being elevated thereby, said lower track means having track extensions projecting from said closed loop in spaced relation below said article supports, first conveying means extending along said lower track means within said closed loop for diverting carriers from said closed loop onto said track extensions, second conveying means extending along said track extensions for transporting carriers along said track extensions from said diverted position to a position out of the path of travel of carriers in said closed loop, a series of equidistantly spaced selector members movable in a closed path in timed relation with said elevating means, said selector members being adapted to be conditioned for indicating carriers selected to be diverted, pre-settable control means for conditioning an electrical circuit for controlling diversion of a desired number of carriers up to a desired maximum number of carriers, switch means disposed in the path of said conditioned selector members for engagement thereby when successive selected carriers reach the forward end of the lower track means of said closed loop and being arranged to complete said conditioned circuit upon each engagement of said switch means, and control means responsive to each completion of said conditioned circuit to successively operate said first and second conveying means to divert said selected carriers from said closed loop and to move them out of the path of travel of carriers in said closed loop.

14. In an article treating apparatus, a plurality of article carriers having vertically spaced shelves, means for conducting a succession of carriers in a closed loop including a pair of vertically spaced upper and lower track means and elevating and lowering means disposed respectively at opposite ends of said track means for transferring said carriers from one to the other of said track means, a pair of vertically spaced article supports disposed exteriorly of said closed loop between the upper and lower ends of said elevating means proximate the path of the articles being elevated thereby, said lower track means having track extensions projecting from said closed loop in spaced relation below said article supports, track shoe means in said closed loop adjacent the lower end of said elevating means movable between a lowered position for guiding carriers in said closed loop from said lower track means to said elevating means and a raised position permitting carriers to be diverted from said closed loop onto said track extensions, first conveying means extending along said lower track means within said closed loop for diverting a carrier from said closed loop onto said track extensions, second conveying means extending along said track extensions for transporting a carrier along said track extensions from said diverted position to a position out of the path of travel of carriers in said closed loop, pre-settable control means for conditioning an electrical circuit for controlling diversion of a desired number of carriers, pre-selecting means operable in timed relation with said elevating means for selecting certain carriers for diversion, control means responsive to said pre-selecting means for completing said conditioned circuit, control means responsive to completion of said conditioned circuit, advancement of a pre-selected carrier to the forward end of the lower track means of said closed loop and elevation of the immediately preceding carrier by said elevating means to a position clearing said pre-selected carrier for raising said track shoes, control means responsive to raising of said track shoes for interrupting operation of said elevating means and initiating operation of said first conveying means to move said pre-selected carrier onto said track extensions out of said closed loop, and control means responsive to movement of said pre-selected rack to said last named position for interrupting operation of said first conveying means and initiating operation of said second conveying means to move said pre-selected rack along said track extensions from said last named position to a position out of the path of travel of carriers in said closed loop.

15. In an article treating apparatus, a plurality of article carriers having vertically spaced shelves, means for conducting a series of carriers in a closed loop including a pair of vertically spaced upper and lower track means, first conveying means including elevating means at the forward ends of said upper and lower track means for transporting successive carriers from said lower track means onto said upper track means to push preceding carriers along said upper track means toward the rearward end thereof and lowering means at the rearward ends of said upper and lower track means for transporting successive carriers from said upper track means onto said lower track means to push preceding carriers along said lower track means toward the forward end thereof, said closed loop having less than a full complement of carriers whereby the forward portion of said lower track means is normally devoid of carriers, second conveying means extending along said lower track means within said closed loop adapted to advance carriers through said space devoid of carriers, a pair of vertically spaced article supports disposed exteriorly of said closed loop between the upper and lower ends of said elevating means proximate the path of carriers being elevated thereby, said lower track means having track extensions projecting from said closed loop in spaced relation below said article supports for supporting carriers adapted to be inserted in said closed loop, third conveying means extending along said track extensions to insert carriers from said track extensions into said closed loop, and control means controlling insertion of carriers from said track extensions into said closed loop following a selected carrier of said closed loop including means responsive to advancement of said selected rack to the forward end of said lower track means of said closed loop to activate said control means for interrupting operation of said second conveying means and means responsive to elevation of said selected rack by said first conveying means to a position above the level of the upper ends of the carriers on said track extensions for operating said third conveying means to insert a carrier into said closed loop.

16. Apparatus in accordance with claim 15, including track shoe means in said closed loop adjacent the lower end of said elevating means mounted for movement between a first postion for guiding carriers in said closed loop from said lower track means to said elevating means and a second position permitting insertion of carriers from said track extensions into said closed loop, motive means for selectively moving said track shoe means between said first and second named positions, and means responsive to activation of said control means for operating said track shoe motive means to move said track shoes to said second position.

17. Apparatus in accordance with claim 15, including track shoe means in said closed loop adjacent the lower end of said elevating means mounted for movement between a first position for guiding carriers in said closed loop from said lower track means to said elevating means and a second position permitting insertion of carriers from said track extensions into said closed loop, motive means for selectively moving said track shoe means between said first and second named positions, means responsive to activation of said control means for operating said track shoe motive means to move said track shoes to said second position, and means responsive to movement of said track shoe means to said second position for interrupting operation of said first conveying means.

References Cited

UNITED STATES PATENTS 2,823,811  2/1958  Temple _____ 214—16.4

GERALD M. FORLENZA, *Primary Examiner.*

R. B. JOHNSON, *Assistant Examiner.*